(12) United States Patent
Karthikeyan et al.

(10) Patent No.: US 8,535,832 B2
(45) Date of Patent: Sep. 17, 2013

(54) METAL OXIDE COATED POSITIVE ELECTRODE MATERIALS FOR LITHIUM-BASED BATTERIES

(75) Inventors: Deepak Kumaar Kandasamy Karthikeyan, Foster City, CA (US); Subramanian Venkatachalam, Pleasanton, CA (US); Herman A. Lopez, Sunnyvale, CA (US); Sujeet Kumar, Newark, CA (US)

(73) Assignee: Envia Systems, Inc., Newark, CA (US)

( * ) Notice: Subject to any disclaimer, the term of this patent is extended or adjusted under 35 U.S.C. 154(b) by 340 days.

(21) Appl. No.: 12/870,096

(22) Filed: Aug. 27, 2010

(65) Prior Publication Data

US 2011/0076556 A1 Mar. 31, 2011

Related U.S. Application Data

(60) Provisional application No. 61/237,344, filed on Aug. 27, 2009, provisional application No. 61/253,286, filed on Oct. 20, 2009.

(51) Int. Cl.
*H01M 4/58* (2010.01)

(52) U.S. Cl.
USPC .............. 429/231.1; 429/231.3; 252/182.1; 427/58; 427/126.1; 427/123

(58) Field of Classification Search
USPC .......... 429/231.1, 231.3; 252/182.1; 427/58, 427/126.1, 123
See application file for complete search history.

(56) References Cited

U.S. PATENT DOCUMENTS

| | | | |
|---|---|---|---|
| 5,658,693 A | 8/1997 | Thackeray et al. |
| 5,674,645 A | 10/1997 | Amatucci et al. |
| 5,820,790 A | 10/1998 | Amine et al. |
| 6,037,095 A | 3/2000 | Miyasaka |
| 6,087,042 A | 7/2000 | Sugiyama et al. |
| 6,168,887 B1 | 1/2001 | Dahn et al. |
| 6,183,718 B1 | 2/2001 | Barker et al. |
| 6,248,477 B1 | 6/2001 | Howard, Jr. et al. |
| 6,251,822 B1 | 6/2001 | Peng et al. |
| 6,322,744 B1 | 11/2001 | Kelley et al. |
| 6,372,385 B1 | 4/2002 | Kweon et al. |
| 6,420,071 B1 | 7/2002 | Lee et al. |
| 6,428,766 B1 | 8/2002 | Fujino et al. |
| 6,489,060 B1 | 12/2002 | Zhang et al. |
| 6,589,499 B2 | 7/2003 | Gao et al. |
| 6,596,435 B2 | 7/2003 | Kelley et al. |
| 6,660,432 B2 | 12/2003 | Paulsen et al. |
| 6,677,082 B2 | 1/2004 | Thackeray et al. |
| 6,680,143 B2 | 1/2004 | Thackeray et al. |
| 6,749,648 B1 | 6/2004 | Kumar et al. |
| 6,872,491 B2 | 3/2005 | Kanai et al. |
| 6,964,828 B2 | 11/2005 | Lu et al. |
| 7,078,128 B2 | 7/2006 | Lu et al. |
| 7,135,252 B2 | 11/2006 | Thackeray et al. |
| 7,205,072 B2 | 4/2007 | Kang et al. |
| 7,285,357 B2 | 10/2007 | Jordy et al. |
| 7,364,793 B2 | 4/2008 | Paulsen et al. |
| 7,368,071 B2 | 5/2008 | Dahn et al. |
| 7,393,476 B2 | 7/2008 | Shiozaki et al. |
| 7,416,813 B2 | 8/2008 | Fujihara et al. |
| 7,435,402 B2 | 10/2008 | Kang et al. |
| 7,452,631 B2 | 11/2008 | Kitao et al. |
| 7,468,223 B2 | 12/2008 | Thackeray et al. |
| 7,517,613 B2 | 4/2009 | Yuasa et al. |
| 7,674,557 B2 | 3/2010 | Sun et al. |
| 7,927,506 B2 | 4/2011 | Park |
| 7,935,270 B2 | 5/2011 | Park |
| 2002/0055042 A1 | 5/2002 | Kweon et al. |
| 2002/0110736 A1* | 8/2002 | Kweon et al. ............. 429/231.1 |
| 2002/0114995 A1 | 8/2002 | Thackeray et al. |
| 2003/0082448 A1 | 5/2003 | Cho et al. |
| 2003/0087155 A1 | 5/2003 | Cho et al. |
| 2003/0108790 A1 | 6/2003 | Manthiram et al. |
| 2004/0076884 A1 | 4/2004 | Lee et al. |
| 2004/0091779 A1 | 5/2004 | Kang et al. |
| 2005/0031942 A1 | 2/2005 | Hennige et al. |
| 2005/0202316 A1 | 9/2005 | Hwang et al. |
| 2006/0051671 A1 | 3/2006 | Thackeray et al. |
| 2006/0051673 A1 | 3/2006 | Johnson et al. |
| 2006/0083991 A1 | 4/2006 | Ahn et al. |
| 2006/0147809 A1 | 7/2006 | Amine et al. |
| 2006/0188781 A1 | 8/2006 | Thackeray et al. |
| 2006/0257743 A1 | 11/2006 | Kuratomi et al. |
| 2006/0275667 A1 | 12/2006 | Watanabe et al. |
| 2007/0072080 A1 | 3/2007 | Inagaki et al. |
| 2007/0111098 A1 | 5/2007 | Yang Kook et al. |

(Continued)

FOREIGN PATENT DOCUMENTS

| | | |
|---|---|---|
| CN | 1130810 A | 9/1996 |
| EP | 2264814 A1 | 12/2010 |

(Continued)

OTHER PUBLICATIONS

Ito et al., "Cyclic deterioration and it's improvement for Li-rich layered cathode material Li [Ni0.17Li0.2Co0.07Mn0.56]O2," Journal of Power Sources, 195: 567-573 (2010).
Ito et al., "A new approach to improve the high-voltage cyclic performance of Li-rich layered cathode material by electrochemical pretreatment," Journal of Power Sources 183: 344-346 (2008).
Shin et al., "Improvement of electrochemical properties of Li[Ni0.4Co0.2Mn(0.4-x)]O2-yFy cathode materials at high voltage region", Electrochimica Acta 52 1477-1482 (2006).
Aurbach et al. "Studies of cycling behavior, ageing, and interfacial reactions of LiNi0.5Mn1.5O4 and carbon electrodes for lithium-ion 5-V cells," J. of Power Sources 162 (2006) 780-789.
Aurbach et al., "On the capacity fading of LiCoO2 intercalation electrodes: the effect of cycling, storage, temperature, and surface film forming additives," Electrochimica Acta 47 (2002) 4291-4306.

(Continued)

*Primary Examiner* — Laura Weiner
(74) *Attorney, Agent, or Firm* — Dardi & Herbert, PLLC; Peter S. Dardi

(57) ABSTRACT

Positive electrode active materials are formed with various metal oxide coatings. Excellent results have been obtained with the coatings on lithium rich metal oxide active materials. Surprisingly improved results are obtained with metal oxide coatings with lower amounts of coating material. High specific capacity results are obtained even at higher discharge rates.

16 Claims, 18 Drawing Sheets

(56) References Cited

U.S. PATENT DOCUMENTS

| | | |
|---|---|---|
| 2007/0202405 A1 | 8/2007 | Shizuka et al. |
| 2007/0292757 A1 | 12/2007 | Watanabe et al. |
| 2008/0102369 A1 | 5/2008 | Sakata et al. |
| 2008/0107968 A1 | 5/2008 | Patoux et al. |
| 2008/0118847 A1 | 5/2008 | Jung et al. |
| 2008/0135802 A1 | 6/2008 | Saito et al. |
| 2008/0157027 A1 | 7/2008 | Manthiram et al. |
| 2008/0193841 A1 | 8/2008 | Sun et al. |
| 2008/0241693 A1 | 10/2008 | Fukuchi et al. |
| 2008/0268347 A1 | 10/2008 | Ohzuku et al. |
| 2009/0087362 A1 | 4/2009 | Sun et al. |
| 2009/0104532 A1 | 4/2009 | Hosoya |
| 2009/0155694 A1 | 6/2009 | Park |
| 2009/0253042 A1 | 10/2009 | Sun et al. |
| 2009/0263707 A1 | 10/2009 | Buckley et al. |
| 2009/0297947 A1 | 12/2009 | Deng et al. |
| 2009/0305131 A1 | 12/2009 | Kumar et al. |
| 2010/0086853 A1 | 4/2010 | Venkatachalam et al. |
| 2010/0086854 A1 | 4/2010 | Kumar et al. |
| 2010/0119942 A1 | 5/2010 | Kumar |
| 2010/0151332 A1 | 6/2010 | Lopez et al. |
| 2011/0017528 A1 | 1/2011 | Kumar et al. |
| 2011/0052981 A1 | 3/2011 | Lopez et al. |
| 2011/0052989 A1 | 3/2011 | Venkatachalam et al. |
| 2011/0111294 A1 | 5/2011 | Lopez et al. |
| 2011/0111298 A1 | 5/2011 | Lopez et al. |
| 2011/0136019 A1 | 6/2011 | Amiruddin et al. |
| 2011/0236751 A1 | 9/2011 | Amiruddin et al. |
| 2011/0244331 A1 | 10/2011 | Karthikeyan et al. |
| 2012/0028105 A1 | 2/2012 | Kumar et al. |
| 2012/0056590 A1 | 3/2012 | Amiruddin et al. |
| 2012/0070725 A1 | 3/2012 | Venkatachalam et al. |
| 2012/0077082 A1 | 3/2012 | Se-Hee et al. |

FOREIGN PATENT DOCUMENTS

| | | |
|---|---|---|
| JP | 57046567 A2 | 4/1982 |
| JP | 06-243871 A | 9/1994 |
| JP | 09-045373 | 2/1997 |
| JP | 10-255837 | 9/1998 |
| JP | 3112138 | 9/2000 |
| JP | 3157413 B2 | 4/2001 |
| JP | 3172388 B2 | 6/2001 |
| JP | 2002-110167 | 4/2002 |
| JP | 3506397 | 12/2003 |
| JP | 2006-134816 | 5/2006 |
| JP | 2006-261127 | 9/2006 |
| JP | 2006-344425 | 12/2006 |
| JP | 2007-220630 | 8/2007 |
| JP | 3276451 | 2/2008 |
| JP | 2008-536285 A | 9/2008 |
| JP | 2008-251480 | 10/2008 |
| JP | 2008-258160 A | 10/2008 |
| JP | 5023541 | 6/2012 |
| KR | 10-2005-0111764 | 11/2005 |
| KR | 10-0578877 | 5/2006 |
| KR | 10-2007-0117827 A | 12/2007 |
| KR | 10-0796953 | 1/2008 |
| KR | 10-0822013 B1 | 4/2008 |
| KR | 10-2008-0099132 A | 11/2008 |
| KR | 10-2009-0078128 A | 7/2009 |
| KR | 10-2010-0007236 | 1/2010 |
| WO | 99/60638 A2 | 11/1999 |
| WO | 01/35473 A1 | 5/2001 |
| WO | 01/91209 A1 | 11/2001 |
| WO | 2004/084330 A2 | 9/2004 |
| WO | 2005/119820 A1 | 12/2005 |
| WO | WO 2005/119820 * | 12/2005 |
| WO | 2006/025707 A1 | 3/2006 |
| WO | 2006/109930 A1 | 10/2006 |
| WO | 2006/137673 A1 | 12/2006 |
| WO | 2008/086041 A1 | 7/2008 |

OTHER PUBLICATIONS

Chen et al., "Studies of LiCoO2 Coated with Metal Oxides," Electrochemical and Solid State Letters, 6 (11) A221-A224 (2003).

Chen et al., "Effect of a ZrO2 Coating on the Structure and Electrochemistry of LixCoO2 When Cycled to 4.5 V," Electrochemical and Solid-State Letters, 5 (10) A213-A216 (2002).

Cho et al., "Comparison of Al2O3- and AlPO4-coated LiCoO2 cathode materials for a Li-ion cell," J. of Power Sources 146 (2005) 58-64.

Cho et al., "LiCoO2 Cathode Material That Does Not Show a Phase Transition from Hexagonal to Monoclinic Phase," J. of the Electrochemical Society, 148 (10) A1110-A1115 (2001).

Cho et al., "High-Performance ZrO2-Coated LiNiO2 Cathode Material," Electrochemical and Solid-State Letters, 4 (10) A159-A161 (2001).

Cho et al., "Zero-Strain Intercalation Cathode for Rechargeable Li-Ion Cell," Angew. Chem. Int. Ed. 2001, 40 (18): 3367-3369.

Cho et al., "Novel LiCoO2 Cathode Material with Al2O3 Coating for a Li Ion Cell," Chem. Mater. 2000, 12 (12), 3788-3791.

Choi et al., "Superior Capacity Retention Spinel Oxyfluoride Cathodes for Lithium-Ion Batteries," Electrochemical and Solid-State Letters 9 (5) (2006) A245-A248.

Fey et al., "Enhanced cyclability of LiCoO2 cathodes coated with alumina drived from carboxylate-alumoxanes," J. of Applied Electrochemistry (2005) 35:177-184.

Fey et al., "Preformed boehmite nanoparticles as coating materials for long-cycling LiCoO2," J. of Applied Electrochemistry 34:715-722 (2004).

Fey et al., "A simple mechano-thermal coating process for improved lithium battery cathode materials," J. of Power Sources 132 (2004) 172-180.

Fey et al., "Saturated linear dicarboxylic acids as chelating agents for the sol-gel synthesis of LiNi0.8Co0.2O2," Materials Chemistry and Physics 87 (2004) 246-255.

Ho et al., "Application of A-C Techniques to the Study of Lithium Diffusion in Tungsten Trioxide Thin Films," J. Electrochem. Soc., 1980; 127(2):343-350.

Hwang et al. "Influence of Mn content on the morphology and electrochemical performance of LiNi1-x-yCoxMnyO2 cathode materials," J. Mater. Chem., 2003; 13:1962-1968.

Ito et al., "The relationship between crystal structure and the electrochemical reaction of Li-rich insertion materials (2)" 2010.

Johnson et al. "The significance of the Li2MnO3 component in 'composite' xLi2MnO3 • (1-x)LiMn0.5Ni0.5O2 electrodes," Electrochemistry Communications 6 (2004) 1085-1091.

Kang et al., "Enhancing the rate capability of high capacity xLi2MnO3 • (1-x)LiMO2 (M=Mn, Ni, Co) electrodes by Li-Ni-PO4 treatment," Electrochemistry Communications 11 (2009) 748-751.

Kang et al., "Layered Li(Li0.2Ni0.15+0.5zCo0.10Mn0.55-0.5z)O2-zFz cathode materials for Li-ion secondary batteries," Journal of Power Sources 146 (2005) 654-657.

Kim et al., "Remarkable improvement in cell safety for Li[Ni0.5Co0.2Mn0.3]O2 coated with LiFePO4," Journal of Alloys and Compounds 492 (2010) L87-L90.

Kim et al., "Synthesis of spherical Li[Ni(1/3-z)Co(1/3-z)Mn(1/3-z)Mgz]O2 as positive electrode material for lithium ion battery," Electrochimica Acta 51 (2006) 2447-2453.

Kim et al., "Improvement of High-Voltage Cycling Behavior of Surface-Modified Li[Ni1/3Co1/3Mn1/3]O2 Cathodes by Fluorine Substitution for Li-Ion Batteries," Journal of the Electrochemical Society 152 (9) A1707-A1713 (2005).

Kim et al., "Electrochemical Stability of Thin-Film LiCoO2 Cathodes by Aluminum-Oxide Coating," Chem. Mater. 2003, 15(7):1505-1511.

Lee et al., "High capacity Li[Li0.2Ni0.2Mn0.6]O2 cathode materials via a carbonate co-precipitation method," J. of Power Sources, 162 (2006), 1346-1350.

Lee et al., "Electrochemical characteristics of Al2O3-coated lithium manganese spinel as a cathode material for a lithium secondary battery," J. of Power Sources 126 (2004) 150-155.

Luo et al., "On the incorporation of fluorine into the manganese spinel cathode lattice," Solid State Ionics 180 (2009) 703-707.

Myung et al., "Effect of AlF3 Coating on Thermal Behavior of Chemically Delithiated Li0.35[Ni1/3Co1/3Mn1/3]O2," J Phys. Chem. C, 114 (10): 4710-4718 (2010).

Okumura et al., "Cathode having high rate performance for a secondary Li-ion cell surface-modified by aluminum oxide nanoparticles," J. of Power Sources 189 (2009) 471-475.

Ohsawa et al., "The relationship between crystal structure and the electrochemical reaction of Li-rich insertion materials (1)," 2010.

Ruberto, "Metastable Alumina from Theory: Bulk, Surface, and Growth of K-Al2O3," Thesis for the Degree of Doctor of Philosophy, Department of Applied Physics, Chalmers University of Technology and Goteborg University, 2001.

Song et al., "Two- and three-electrode impedance spectroscopy of lithium-ion batteries," J. of Power Sources, 2002; 111:255-267.

Sun et al, "AlF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).

Sun et al., "The preparation and electrochemical performance of solid solutions LiCoO2-Li2MnO3 as cathode materials for lithium ion batteries," J of Power Sources 159 (2006) 1353-1359.

Sun et al., "Significant Improvement of high voltage cycling behavior AlF3-coated LiCoO2 cathode," Electrochemistry Communications 8 (2006) 821-826.

Thackeray et al., "Li2MnO3-stabilized LiMO2 (M = Mn, Ni, Co) electrodes for lithium-ion batteries," J. Mater. Chem., 2007; 17:3112-3125.

Thackeray et al., "Comments on the structural complexity of lithium-rich Li1+xM1-xO2 electrodes (M=Mn,Ni,Co) for lithium batteries," Electrochemistry Communications 8 (2006), 1531-1538.

Woo et al., "Significant Improvement of Electrochemical Performance of AlF3-Coated Li[Ni0.8Co0.1Mn0.1]O2 Cathode Materials," J. of the Electrochemical Society, 154 (11) A1005-A1009 (2007).

Wu et al., "High Capacity, Surface-Modified Layered Li[Li(1-x)/3Mn(2-x)/3Nix/3Cox/3]O2 Cathodes with Low Irreversible Capacity Loss," Electrochemical and Solid State Letters, 9 (5) A221-A224 (2006).

Yabuuchi et al., "Study of LiMnO3-Li(Co1/3Ni1/3Mn1/3)O2 for High Capacity Positive Electrode Material: II. Redox Reaction at the Positive Electrode/Electrolyte Interface," 2010.

Yoshii et al., "Study of LiMnO3-Li(Co1/3Ni1/3Mn1/3)O2 for High Capacity Positive Electrode Material: I. Change in the Crystal and Electronic Structure upon Li de-intercalation," 2010.

Amiruddin et al., pending U.S. Appl. No. 12/630,992, "Lithium Ion Battery with High Voltage Electrolytes and Additives," filed Dec. 4, 2009.

Lopez et al., pending U.S. Appl. No. 12/616,226, "Coated Positive electrode Materials for Lithium Ion Batteries," filed Nov. 11, 2009.

International Search Report and Written Opinion for Application No. PCT/US2010/046941, dated Jun. 3, 2011.

Boulineau et al., "Reinvestigation of Li2MnO3 Structure: Electron Diffraction and High Resolution TEM," Chem. Mater. 2009, 21, 4216-4222.

Hong et al., "Structural evolution of layered Li1.2Ni0.2Mn0.6O2 upon electrochemical cycling in a Li rechargeable battery," J. Mater. Chem., 2010, 20, 10179-10186.

Johnson et al., "Lithium-manganese oxide electrodes with layered-spinel composite structures xLi2MnO3 • (1-x)Li1+yMn2-yO4 (0<x<1, 0≤y≤0.33) for lithium batteries," Electrochemistry Communications 7 (2005) 528-536.

Kang et al., "The Effects of Acid Treatment on the Electrochemical Properties of 0.5 Li2MnO3-0.5 LiNi0.44Co0.25Mn0.31O2 Electrodes in Lithium Cells," Journal of the Electrochemical Society 153(6):A1186-A1192 (2006).

Park et al., "Physical and electrochemical properties of spherical Li1+x(Ni1/3Co1/3Mn1/3)1-xO2 cathode materials", Journal of Power Sources, 177:177-183 (2008).

Robertson et al., "Mechanism of Electrochemical Activity in Li2MnO3," Chem. Mater. 2003, 15, 1984-1992.

Yabuuchi et al., "Detailed Studies of a High-Capacity Electrode Material for Rechargeable Batteries, Li2MnO3-LiCo1/3Ni1/3Mn1/3O2," J. Am. Chem. Soc. 2011, 133, 4404-4419.

Jung et al., "Ultrathin Direct Atomic Layer Deposition on Composite Electrodes for Highly Durable and Safe Li-Ion Batteries," Advanced Materials,A29 22:2172-2176 (2010).

Jung et al., "Enhanced Stability of LiCoO2 Cathodes in Lithium-Ion Batteries Using Surface Modification by Atomic Layer Deposition," The Journal of the Electrochemical Society, 157(1):A75-A81 (2010).

Riley et al., "Improved Mechanical Integrity of ALD-Coated Composite Electrodes for Li-Ion Batteries," Electrochemical and Solid State Letters, 14(3):A39-A31 (2011).

Armstrong et al., "Demonstrating Oxygen Loss and Associated Structural Reorganization in the Lithium Battery Cathode Li[NiLiMn]O," J. Am. Chem. Soc., 2006, 128 (26), 8694-8698.

Kim et al., "Electrochemical and Structural Properties of xLi2M'O3•(1-x)LiMn0.5Ni0.5O2 Electrodes for Lithium Batteries (M' = Ti, Mn, Zr; 0 < x < 0.3)" Chem. Mater. 2004, 16, 1996-2006.

Park et al., "Lithium-manganese-nickel-oxide electrodes with integrated layered-spinel structures for lithium batteries," Electrochemistry Communications 9 (2007) 262-268.

Thackeray et al., "Advances in manganese-oxide 'composite' electrodes for lithium-ion batteries," J. Mater. Chem., 2005,15, 2257-2267.

Zheng et al., "The Effects of AlF3 Coating on the Performance of Li[Li0.2Mn0.54Ni0.13Co0.13]O2 Positive Electrode Material for Lithium-Ion Battery," Journal of the Electrochemical Society, 155 (10)A775-A782 (2008).

Wang et al, "High capacity double-layer surface modified Li[Li02Mn0.54Ni0.13Co0.13]O2 cathode with improved rate capability," J. Mater. Chem., 19:4965-4972 (2009).

Office Action for Corresponding Taiwanese Patent Application No. 099128958, issued Mar. 21, 2013.

* cited by examiner

METAL OXIDE COATED POSITIVE ELECTRODE MATERIALS FOR LITHIUM-BASED BATTERIES

CROSS REFERENCE TO RELATED APPLICATIONS

This application claims priority to U.S. provisional patent application Ser. No. 61/237,344, filed on Aug. 27, 2009 to Venkatachalam et al., entitled "Cathode Compositions for Lithium Ion Batteries" and U.S. provisional patent application Ser. No. 61/253,286, filed on Oct. 20, 2009 to Venkatachalam et al., entitled "Metal Oxide Coated Positive Electrode Materials for Lithium Ion Batteries," both incorporated herein by reference.

FIELD OF THE INVENTION

The inventions, in general, are related to active materials for positive electrodes for a lithium ion battery, in which the active material has a coating comprising a metal/metalloid oxide. The inventions are further related to method for forming the metal/metalloid oxide coated active material and to lithium ion batteries comprising the active material.

BACKGROUND

Lithium batteries are widely used in consumer electronics due to their relatively high energy density. Rechargeable batteries are also referred to as secondary batteries, and lithium ion secondary batteries generally have a negative electrode material that incorporates lithium when the battery is charged. For some current commercial batteries, the negative electrode material can be graphite, and the positive electrode material can comprise lithium cobalt oxide ($LiCoO_2$). In practice, only a modest fraction of the theoretical capacity of the positive electrode active material generally can be used. At least two other lithium-based positive electrode active materials are also currently in commercial use. These two materials are $LiMn_2O_4$, having a spinel structure, and $LiFePO_4$, having an olivine structure. These other materials have not provided any significant improvements in energy density.

Lithium ion batteries are generally classified into two categories based on their application. The first category involves high power battery, whereby lithium ion battery cells are designed to deliver high current (Amperes) for such applications as power tools and Hybrid Electric Vehicles (HEVs). However, by design, these battery cells are lower in energy since a design providing for high current generally reduces total energy that can be delivered from the battery. The second design category involves high energy batteries, whereby lithium ion battery cells are designed to deliver low to moderate current (Amperes) for such applications as cellular phones, lap-top computers, Electric Vehicles (EVs) and Plug in Hybrid Electric Vehicles (PHEVs) with the delivery of higher total capacity.

SUMMARY OF THE INVENTION

In a first aspect, the invention pertains to a lithium ion battery positive electrode material comprising a lithium metal oxide approximately represented by the formula $Li_{1+x}M_{1-x}O_{2-z}F_z$, where M is a non-lithium metal element or a combination thereof and $0.01 \leq x \leq 0.3$, $0 \leq z \leq 0.2$, coated with from about 0.1 to about 0.75 weight percent of a metal/metalloid oxide.

In another aspect, the invention pertains to lithium ion battery positive electrode material comprising a lithium metal oxide coated with a metal/metalloid oxide coating composition wherein the lithium metal oxide can be approximately represented by a formula $Li_{1+b}Ni_\alpha Mn_\beta Co_\gamma A_\delta O_{2-z}F_z$, where b ranges from about 0.05 to about 0.3, α ranges from 0 to about 0.4, β range from about 0.2 to about 0.65, γ ranges from 0 to about 0.46, δ ranges from about 0 to about 0.15, z ranges form 0 to about 0.2, with the proviso that both α and γ are not zero and where A is Mg, Sr, Ba, Cd, Zn, Al, Ga, B, Zr, Ti, Ca, Ce, Y, Nb, Cr, Fe, V, or combinations thereof. The coating composition generally comprises less than 2 weight percent of the positive electrode material. Also, the positive electrode material can have a specific discharge capacity of at least about 260 mAh/g with a discharge rate of C/3 when discharged from 4.6V to 2.0 V at room temperature.

In a further aspect, the invention pertains to lithium ion battery comprising a positive electrode, a negative electrode comprising a lithium incorporation composition, a separator between the positive electrode and the negative electrode, and an electrolyte comprising lithium ions. The positive electrode generally comprises an active material, distinct electrically conductive powders, and a polymer binder. Also, the positive electrode active material comprises lithium metal oxide coated with a metal/metalloid oxide coating composition. The lithium metal oxide can be approximately represented by a formula $Li_{1+b}Ni_\alpha Mn_\beta Co_\gamma A_\delta O_{2-z}F_z$, where b ranges from about 0.05 to about 0.3, α ranges from 0 to about 0.4, β range from about 0.3 to about 0.65, γ ranges from 0 to about 0.46, δ ranges from about 0 to about 0.15 and z ranges from 0 to about 0.2, with the proviso that both α and γ are not zero and where A is Mg, Sr, Ba, Cd, Zn, Al, Ga, B, Zr, Ti, Ca, Ce, Y, Nb, Cr, Fe, V, or combinations thereof, The coating composition can comprise less than 2 weight percent of the positive electrode material. In some embodiments, the positive electrode material has a specific discharge capacity of at least about 230 mAh/g with a discharge rate of C/3 at the 50th charge/discharge cycle when discharged from 4.6V to 2.0 V at room temperature.

In other aspects, the invention pertains to a method for fanning a coated positive electrode active composition for a lithium-based battery in which the method comprises heating the active material with an aluminum precursor coating to a temperature from about 500° C. to about 800° C.

DETAILED DESCRIPTION OF PREFERRED EMBODIMENTS

Figure 1:
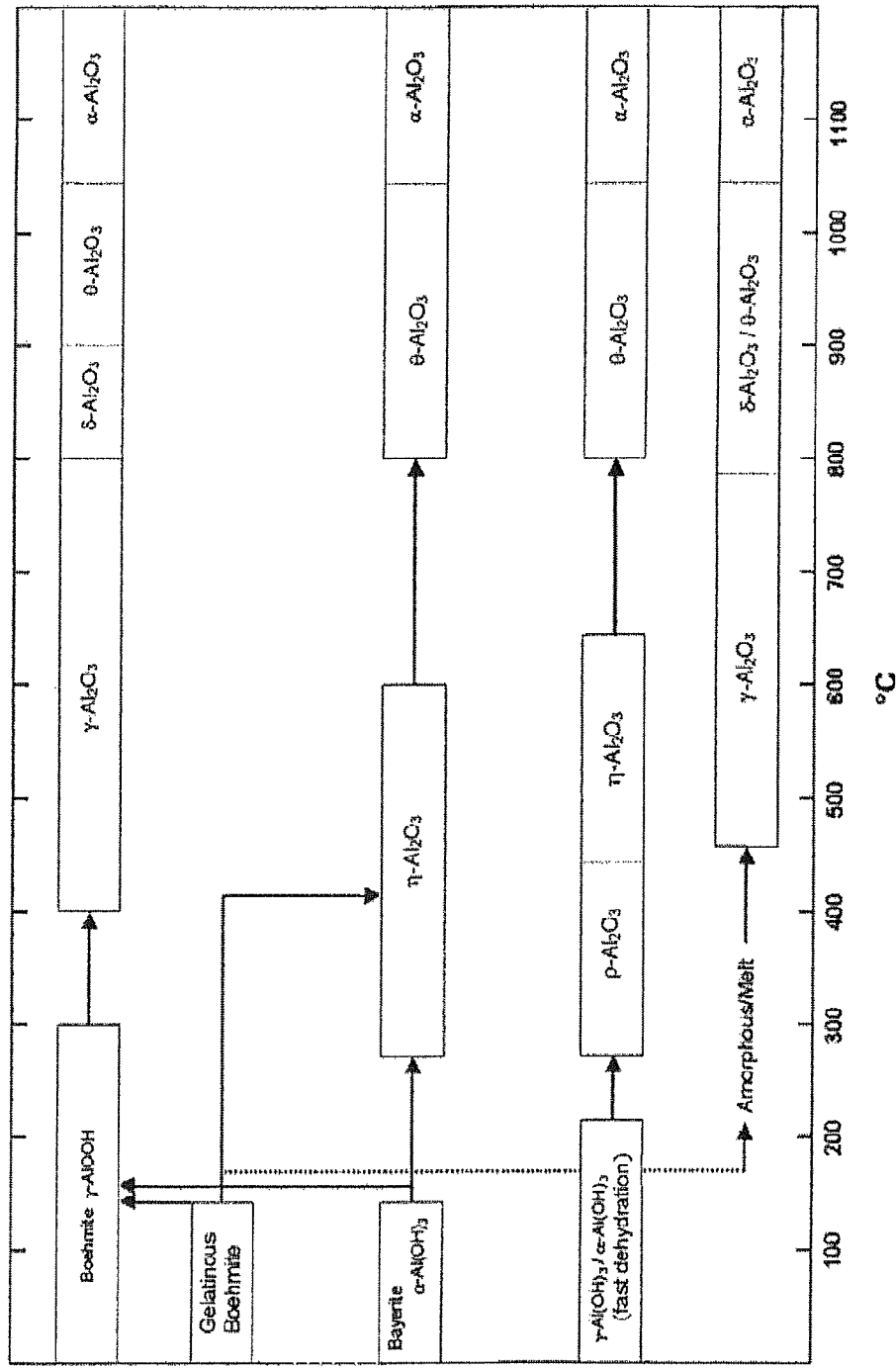
FIG. 1 is a schematic diagram showing phases of aluminum oxide that can be accessed at different processing temperatures and processing routes.

It has been found that relatively small amounts of metal oxide coatings on a lithium rich metal oxide active material can provide desirable improvements in lithium-based battery performance with respect to both specific discharge capacity and cycling. In some embodiments, it can be desirable to coat an active material of a positive electrode with no more than about 2 weight percent metal oxide. The resulting coated material can exhibit significantly greater specific discharge capacity relative to the uncoated material. The materials can also exhibit a significant decrease in the rate of fade of specific discharge capacity upon cycling of the battery at reasonable rates. The discharge properties surprisingly can improve with decreased amounts of coating material at least down to relatively small amounts of coating material. The dependences specific discharge capacities on coating amounts can be more significant at greater discharge rates since moderate amounts of coatings can result in lower specific capacities than exhibited by uncoated materials while appropriate thinner coatings result in an increase in specific discharge capacities. The coatings can be synthesized effectively using techniques that are readily scalable for commercial production. In addition, the coated active materials can be synthesized at high tap densities, such that the resulting batteries can exhibit high effective capacities for a given battery volume.

The batteries described herein are lithium-based batteries in which a non-aqueous electrolyte solution comprises lithium ions. For secondary lithium ion batteries during charge, oxidation takes place in the cathode (positive electrode) where lithium ions are extracted and electrons are released. During discharge, reduction takes place in the cathode where lithium ions are inserted and electrons are consumed. Generally, the batteries are formed with lithium ions in the positive electrode material such that an initial charge of the battery transfers a significant fraction of the lithium from the positive electrode material to the negative electrode material to prepare the battery for discharge. Unless indicated otherwise, performance values referenced herein are at room temperature.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic. Additionally, the term "pristine" is used herein to refer to uncoated state of the active material relative to coated state.

Lithium ion batteries described herein have achieved improved cycling performance associated with the metal oxide coatings while exhibiting high specific capacity and high overall capacity. Suitable synthesis techniques for the lithium rich metal oxides include, for example, co-precipitation approaches or sol-gel synthesis. The combination of improved cycling performance, high specific capacity, and high overall capacity suggests that the resulting lithium ion batteries can serve as an improved power source, particularly for high energy applications, such as electric vehicles, plug in hybrid vehicles and the like.

In some embodiments, the lithium ion batteries can use a positive electrode active material that is lithium rich relative to a reference homogenous electroactive lithium metal oxide composition. The excess lithium can be referenced relative to a composition $LiMO_2$, where M is one or more metals with an average oxidation state of +3. The additional lithium in the initial cathode material provides corresponding additional lithium that can be transferred to the negative electrode during charging to increase the battery capacity for a given weight of cathode active material. In some embodiments, the additional lithium is accessed at higher voltages such that the initial charge takes place at a higher voltage to access the additional capacity represented by the additional lithium of the positive electrode. It has been observed that the lithium rich active materials can undergo significant irreversible changes during the first charge of the battery, but these lithium rich compositions can still exhibit surprisingly large specific discharge capacity on cycling.

It is believed that appropriately formed lithium-rich lithium metal oxides have a composite crystal structure in which the excess lithium supports the formation of an alternative crystalline phase. For example, in some embodiments of lithium rich materials, a $Li_2MnO_3$ material may be structurally integrated with either a layered $LiMO_2$ component or similar composite compositions with the manganese cations substituted with other transition metal cations with appropriate oxidation states. In some embodiments, the positive electrode material can be represented in two component notation as $x\ Li_2M'O_3 \cdot (1-x)LiMO_2$ where M is one or more metal cations with an average valance of +3 with at least one cation being a Mn ion or a Ni ion and where M' is one or more metal cations with an average valance of +4. These compositions are described further, for example, in U.S. Pat. No. 6,680,143 to Thackeray et al., entitled "Lithium Metal Oxide Electrodes for Lithium Cells and Batteries," incorporated herein by reference.

Positive electrode active materials of particular interest have a formula $Li_{1+b}Ni_\alpha Mn_\beta Co_\gamma A_\delta O_{2-z}F_z$, where b ranges from about 0.05 to about 0.3, $\alpha$ ranges from 0 to about 0.4, $\beta$ range from about 0.2 to about 0.65, $\gamma$ ranges from 0 to about 0.46, $\delta$ ranges from about 0 to about 0.15, and z ranges from 0 to about 0.2 with the proviso that both $\alpha$ and $\gamma$ are not zero, and where A is Mg, Sr, Ba, Cd, Zn, Al, Ga, B, Zr, Ti, Ca, Ce, Y, Nb, Cr, Fe, V or combinations thereof. Furthermore, surprisingly large capacities have been obtained for $Li[Li_{0.2}Ni_{0.175}Co_{0.10}Mn_{0.525}]O_2$, as presented in copending U.S. patent application Ser. No. 12/332,735 to Lopez et al. (the '735 application) entitled "Positive Electrode Material for High Specific Discharge Capacity Lithium Ion Batteries", incorporated herein by reference. The materials in the '735 application were synthesized using a carbonate co-precipitation process. Also, very high specific capacities were obtained for this composition using hydroxide co-precipitation and sol gel synthesis approaches as described in U.S. application Ser. No. 12/246,814 to Venkatachalam et al. (the '814 application) entitled "Positive Electrode Material for Lithium Ion Batteries Having a High Specific Discharge Capacity and Processes for the Synthesis of these Materials", incorporated herein by reference. These compositions have a low risk of fire for improved safety properties due to their specific compositions with a layered structure and reduced amounts of nickel relative to some other high capacity cathode materials. These compositions use low amounts of elements that are less desirable from an environmental perspective, and can be produced from starting materials that have reasonable cost for commercial scale production.

Carbonate and hydroxide co-precipitation processes has been performed for the desired lithium rich metal oxide materials described herein having nickel, cobalt and manganese cations in the composition and exhibiting the high specific capacity performance. In addition to the high specific capacity, the materials can exhibit a large tap density which leads to high overall capacity of the material in fixed volume applications. Specifically, the specific lithium rich composition of the previous paragraph formed by a co-precipitation process is used in coated forms to generate the results in the Examples below.

When the corresponding batteries with the intercalation-based positive electrode active materials are in use, the intercalation and release of lithium ions from the lattice induces changes in the crystalline lattice of the electroactive material. As long as these changes are essentially reversible, the capacity of the material does not change significantly with cycling. However, the capacity of the active materials is observed to decrease with cycling to varying degrees. Thus, after a number of cycles, the performance of the battery falls below acceptable values, and the battery is replaced. Also, on the first cycle of the battery, generally there is an irreversible capacity loss that is significantly greater than per cycle capacity loss at subsequent cycles. The irreversible capacity loss is the difference between the charge capacity of the new battery and the first discharge capacity. The irreversible capacity loss results in a corresponding decrease in the capacity, energy and power for the cell. The irreversible capacity lose generally can be attributed to changes during the initial charge-discharge cycle of the battery materials that are substantially maintained during subsequent cycling of the battery. Some of these irreversible capacity losses can be attributed to the positive electrode active materials, and the coated materials described herein result in a decrease in the irreversible capacity loss of the batteries.

Uncoated cathode materials can have exceptionally high capacity, e.g. >250 mAh/g during the initial cycles. However, significant capacity fade is seen occurring over extended periods of cycling especially at higher currents or discharge rates. A potential contribution to the capacity fade is a higher charge cut-off voltage, which might trigger the possible non-lithium metal ion dissolution especially Mn from the positive electrode. The Mn dissolution may occurs through a disproportionate reaction of $Mn^{3+}:2Mn^{3+}\rightarrow Mn^{2+}+Mn^{4+}$, where the $Mn^{2+}$ is believed to migrate to the electrolyte and to the anode, i.e., negative electrode resulting in a capacity fade. The disproportionation reaction of $Mn^{+3}$ may occur spontaneously with greater frequency at higher temperatures and at higher charge/discharge rates. In high capacity cathode (i.e., positive electrode), the as-synthesized material has mainly $Mn^{4+}$ which is not prone to ion dissolution while the continued cycling leads to formation of $Mn^{3+}$ which is prone to dissolution leading to fade in capacity. By incorporating a metal oxide, e.g., mixed metal oxide, nano-coating on the surface of the high capacity cathode particles, the cycle life of the high capacity cathode based lithium ion cell battery can be improved. The metal oxide coating may also decrease other irreversible changes to the lithium metal oxide active materials that can also contribute to capacity fade with cycling.

Appropriate coating materials can both improve the long term cycling performance of the material as well as decrease the first cycle irreversible capacity loss. While not wanting to be limited by theory, the coatings may stabilize the crystal lattice of the positive electrode active material during the uptake and release of lithium ions so that irreversible changes in the crystal lattice are reduced significantly. For example, metal fluoride compositions can also be used as effective coatings. The general use of metal fluoride compositions as coatings for cathode active materials, specifically $LiCoO_2$ and $LiMn_2O_4$, is described in published PCT application WO 2006/109930A to Sun et al., entitled "Cathode Active Material Coated with Fluorine Compound for Lithium Secondary Batteries and Method for Preparing the Same," incorporated herein by reference. It has been discovered that thin metal fluoride coatings provide particularly improved performance with performance for many battery parameters of interest peaking at a relatively thin coating thickness of less than 10 nanometers. Improved thin metal fluoride coatings are described further in copending U.S. patent application Ser. No. 12/616,226 to Lopez et al., entitled "Coated Positive Electrode Materials for Lithium Ion Batteries," incorporated herein by reference.

It has been found that metal oxide coatings provide a peak performance improvement at low amounts of coating material. An appropriately selected metal oxide coating can provide improvements in specific capacity even at relatively high rates. In general, the specific capacity of the active material in a positive electrode increases significantly with a coating that is applied at a relatively low amount. In general, the performance of the material in the positive electrode with respect to specific capacity is better if there is less than about 1 weight percent metal oxide coating. The coatings have also been found useful for improving the cycling performance and reducing fade with cycling.

In general, the metal oxide coatings can be formed by first precipitating a hydroxide as a solid or as a sol gel from a solution containing a powder of the active material. The amount of precipitated material can be selected to form the desired amount of coating material. Similarly, a metal carbonate can be precipitated to form a precursor coating. The resulting material can be dried and calcined at an appropriate temperature generally above about 300° C. to convert the precursor coating of metal hydroxide or metal carbonate into the metal oxide.

In additional embodiments, it has been found that an alternative method for forming the metal oxide coating involves decomposition of a metal nitrate. Appropriate metal nitrates decompose at high temperature to form the corresponding metal oxide. The active lithium metal oxide powder can be mixed with a metal nitrate solution in appropriate amounts to form the desired coating material. Since metal nitrates are generally soluble in aqueous solution, the metal nitrate solution can then be dried to form a powder with a dried precursor coating on the active particles. The dried powder can then be heated to decompose the metal nitrate to form the metal oxide coating.

It is useful to note that during charge/discharge measurements, the specific capacity of a material depends on the rate of discharge. The greatest specific capacity of a particular material is measured at very slow discharge rates. In actual use, the actual specific capacity is less than the maximum value due to discharge at a faster rate. More realistic specific capacities can be measured using reasonable rates of discharge that are more similar to the rates encountered during actual use. For example, in low to moderate rate applications, a reasonable testing rate involves a discharge of the battery over three hours. In conventional notation this is written as C/3 or 0.33 C. Faster or slower discharge rates can be used as desired, and the rates can be described with the same notation.

The materials described herein can also exhibit a large tap density, such as values of at least about 1.65 grams/milliliter (g/ml). In general, when specific capacities are comparable, a larger tap density of positive electrode material results in a higher overall capacity of a battery, especially in view of the large specific capacities of the positive electrode materials described herein. The large tap density of the active material also can result in a battery with a greater specific energy and specific power. Generally, a battery with a greater capacity can provide for longer discharge times for a specific application. Thus, these batteries can exhibit a meaningfully improved performance.

Rechargeable batteries have a range of uses, such as mobile communication devices, such as phones, mobile entertainment devices, such as MP3 players and televisions, portable computers, combinations of these devices that are finding wide use, as well as transportation devices, such as automobiles and fork lifts. Most of the batteries used in these electronic devices have a fixed volume. It is therefore highly desirable that the positive electrode material used in these batteries has a high tap density so there is essentially more chargeable material in the positive electrode yielding a higher total capacity of the battery. The batteries described herein that incorporate improved positive electrode active materials with respect to specific capacity, tap density, and cycling can provide improved performance for consumers, especially for medium current applications.

The batteries described herein are suitable for vehicle applications. In particular, these batteries can be used in battery packs for hybrid vehicles, plug-in hybrid vehicles and purely electric vehicles. These vehicles generally have a battery pack that is selected to balance weight, volume and capacity. While larger battery packs can provide a greater range on electric operation, larger packs take up more room that is then not available for other purposes and have greater weight that can decrease performance. Thus, due to the high capacity of the batteries described herein, a battery pack that yields a desired amount of total power can be made in a reasonable volume, and these battery packs can correspondingly achieve the excellent cycling performance described herein.

Positive Electrode Active Material

The positive electrode active materials comprise lithium intercalating metal oxide compositions. In some embodiments, the lithium ion batteries can comprise a positive electrode active material that is lithium rich relative to a reference homogenous electroactive lithium metal oxide composition. Generally, $LiMO_2$ can be considered the reference composition, and the lithium rich compositions can be referred to with an approximate formula $Li_{1+x}M_{1-y}O_2$, where M represents one or more non-lithium metals and y is related to x based on the average valance of the metals. In some embodiments, the lithium rich compositions generally are believed to form a layered composite crystal structure, and for these embodiments x is approximately equal to y. The additional lithium in the initial cathode material provides to some degree corresponding additional lithium that can be transferred to the negative electrode during charging that can increase the battery capacity for a given weight of cathode active material. In some embodiments, the additional lithium is accessed at higher voltages such that the initial charge takes place at a higher voltage to access the additional capacity.

Positive electrode active materials of particular interest represented approximately by a formula $Li_{1+b}Ni_\alpha Mn_\beta Co_\gamma A_\delta O_{2-z}F_z$, where b ranges from about 0.05 to about 0.3, α ranges from 0 to about 0.4, β range from about 0.2 to about 0.65, γ ranges from 0 to about 0.46, δ ranges from 0 to about 0.15 and z ranges from 0 to about 0.2 with the proviso that both α and γ are not zero, and where A is Mg, Sr, Ba, Cd, Zn, Al, Ga, B, Zr, Ti, Ca, Ce, Y, Nb, Cr, Fe, V or combinations thereof. In some embodiments, α ranges from about 0.1 to about 0.3, β range from about 0.3 to about 0.65, γ ranges from about 0.05 to about 0.4. If b+α+β+γ+δ is approximately equal to 1, the positive electrode material with the formula above can be represented approximately in two component notation as $x\, Li_2M'O_3 \cdot (1-x)LiMO_2$ where $0<x<1$, M is one or more metal cations with an average valance of +3 with at least one cation being a Mn ion or a Ni ion and where M' is one or more metal cations with an average valance of +4. It is believed that appropriately formed lithium-rich lithium metal oxides can have a composite crystal structure in which the excess lithium supports the formation of an alternative crystalline phase. For example, in some embodiments of lithium rich materials, a Li$_2$MnO$_3$ material may be structurally integrated with either a layered LiMO$_2$ component where M represents selected non-lithium metal elements or combinations thereof. These compositions are described generally, for example, in U.S. Pat. No. 6,680,143 to Thackeray et al., entitled "Lithium Metal Oxide Electrodes for Lithium Cells and Batteries," incorporated herein by reference. To simplify the following discussion in this section, the optional fluorine dopant is not discussed further.

The structure of some specific layered structures is described further in Thackery et al., "Comments on the structural complexity of lithium-rich Li$_{1+x}$M$_{1-x}$O$_2$ electrodes (M=Mn, Ni, Co) for lithium batteries," Electrochemistry Communications 8 (2006), 1531-1538, incorporated herein by reference. The study reported in this article reviewed compositions with the formulas Li$_{1+x}$[Mn$_{0.5}$Ni$_{0.5}$]$_{1-x}$O$_2$ and Li$_{1+x}$[Mn$_{0.333}$Ni$_{0.333}$Co$_{0.333}$]$_{1-x}$O$_2$. The article also describes the structural complexity of the layered materials.

With respect to lithium rich metal oxides, surprisingly large capacities have been obtained for Li[Li$_{0.2}$Ni$_{0.175}$Co$_{0.10}$Mn$_{0.525}$]O$_2$, as presented in copending U.S. patent application Ser. No. 12/332,735 to Lopez et al. (the '735 application) entitled "Positive Electrode Material for High Specific Discharge Capacity Lithium Ion Batteries", incorporated herein by reference. The materials in the '735 application were synthesized using a carbonate co-precipitation process. Also, very high specific capacities were obtained for this composition using hydroxide co-precipitation and sol gel synthesis approaches as described in U.S. application Ser. No. 12/246,814 to Venkatachalam et al. (the '814 application) entitled "Positive Electrode Material for Lithium Ion Batteries Having a High Specific Discharge Capacity and Processes for the Synthesis of these Materials", incorporated herein by reference. These manganese rich compositions have a low risk of fire for improved safety properties due to their specific compositions with a layered structure and reduced amounts of nickel relative to some other high capacity cathode materials. These compositions use lower amounts of elements that are less desirable from an environmental perspective, and can be produced from starting materials that have reasonable cost for commercial scale production.

Recently, it has been found that the performance properties of the positive electrode active materials can be engineered around the specific design of the composition stoichiometry. The positive electrode active materials of particular interest can be represented approximately in two component notation as x Li$_2$MnO$_3$.(1−x) LiMO$_2$, where M is two or more metal elements with an average valance of +3 and with one of the metal elements being Mn and with another metal element being Ni and/or Co. In general, 0<x<1, but in some embodiments 0.03≦x≦0.55, in further embodiments 0.075≦x≦0.50, in additional embodiments 0.1≦x≦0.45, and in other embodiments 0.15≦x≦0.425. A person of ordinary skill in the art will recognize that additional ranges within the explicit ranges of parameter x above are contemplated and are within the present disclosure. For example, M can be a combination of nickel, cobalt and manganese, which, for example, can be in oxidation states Ni$^{+2}$, Co$^{+3}$, and Mn$^{+4}$ within the initial lithium manganese oxides. The overall formula for these compositions can be written as Li$_{2(1+x)/(2+x)}$Mn$_{2x/(2+x)}$M$_{(2-2x)/(2+x)}$O$_2$. In the overall formula, the total amount of manganese has contributions from both constituents listed in the two component notation. Thus, in some sense the compositions are manganese rich.

In general, M can be written as Ni$_u$Mn$_v$Co$_w$A$_y$. For embodiments in which y=0, this simplifies to Ni$_u$Mn$_v$Co$_w$. If M includes Ni, Co, Mn, and optionally A the composition can be written alternatively in two component notation and single component notation as the following.

$$x\text{Li}_2\text{MnO}_3 \cdot (1-x)\text{Li Ni}_u\text{Mn}_v\text{Co}_w\text{A}_y\text{O}_2, \quad (1)$$

$$\text{Li}_{1+b}\text{Ni}_\alpha\text{Mn}_\beta\text{Co}_\gamma\text{A}_\delta\text{O}_2, \quad (2)$$

with u+v+w+y≈1 and b+α+β+γ+δ≈1. The reconciliation of these two formulas leads to the following relationships:
b=x/(2+x),
α=2u(1−x)/(2+x),
β=2x/(2+x)+2v(1−x)/(2+x),
γ=2w(1−x)/(2+x),
δ=2y(1−x)/(2+x),
and similarly,
x=2b/(1−b),
u=α/(1−3b),
v=(β−2b)/(1−3b),
w=γ/(1−3b),
y=δ/(1−3b).

In some embodiments, it may be desirable to have u≈v, such that Li Ni$_u$Mn$_v$Co$_w$A$_y$O$_2$ becomes approximately Li Ni$_u$Mn$_u$Co$_w$A$_y$O$_2$. In this composition, when y=0, the average valance of Ni, Co and Mn is +3, and if u≈v, then these elements can be believed to have valances of approximately Ni$^{+2}$, Co$^{+3}$ and Mn$^{+4}$. When the lithium is hypothetically fully extracted, all of the elements go to a +4 valance. A balance of Ni and Mn can provide for Mn to remain in a +4 valance as the material is cycled in the battery. This balance avoids the formation of Mn$^{+3}$, which has been associated with dissolution of Mn into the electrolyte and a corresponding loss of capacity.

In further embodiments, the composition can be varied around the formula above such that Li Ni$_{u+\Delta}$Mn$_{u-\Delta}$Co$_w$A$_y$O$_2$, where the absolute value of Δ generally is no more than about 0.3 (i.e., −0.3≦Δ≦0.3), in some embodiments no more than about 0.2, in other embodiments no more than 0.175 and in further embodiments no more than about 0.15. Desirable ranges for x are given above. With 2u+w+y≈1, desirable ranges of parameters are in some embodiments 0≦w≦1, 0≦u≦0.5, 0≦y≦0.1 (with the proviso that both u+Δ and w are not zero), in further embodiments, 0.1≦w≦0.6, 0.1≦u≦0.45, 0≦y≦0.075, and in additional embodiments 0.2≦w≦0.475, 0.2≦u≦0.4, 0≦y≦0.05. A person of ordinary skill in the art will recognize that additional ranges of composition parameters within the explicit ranges above are contemplated and are within the present disclosure. As used herein, the notation (value1≦variable≦value2) implicitly assumes that value 1 and value 2 are approximate quantities. The engineering of the composition to obtain desired battery performance properties is described further in copending U.S. patent application filed on the same day as the present application Ser. No. 12/869,976 to Lopez et al., entitled "Layer-Layer Lithium Rich Complex Metal Oxides With High Specific Capacity and Excellent Cycling," incorporated herein by reference.

Synthesis of Positive Electrode Action Compositions

Synthesis approaches described herein can be used to form the positive electrode active compositions, for example, layered-layered lithium rich positive electrode active materials with high values of specific capacity and a relatively high tap density. The synthesis methods have been adapted for the synthesis of compositions with the formula Li$_{1+b}$Ni$_\alpha$Mn$_\beta$ $Co_yA_8O_{2-z}F_z$ and the desired parameter ranges, as described above. The synthesis approaches are also suitable for commercial scale up. Specifically, co-precipitation process can be used to synthesize the desired lithium rich positive electrode materials with desirable results.

In the co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 1 M and 3 M. The relative molar quantities of metal salts can be selected based on the desired formula for the product materials. Similarly, the optional dopant elements can be introduced along with the other metal salts at the appropriate molar quantity such that the dopant is incorporated into the precipitated material. The pH of the solution can then be adjusted, such as with the addition of $Na_2CO_3$ and/or ammonium hydroxide, to precipitate a metal hydroxide or carbonate with the desired amounts of metal elements. Generally, the pH can be adjusted to a value between about 6.0 to about 12.0. The solution can be heated and stirred to facilitate the precipitation of the hydroxide or carbonate. The precipitated metal hydroxide or carbonate can then be separated from the solution, washed and dried to form a powder prior to further processing. For example, drying can be performed in an oven at about 110° C. for about 4 to about 12 hours. A person of ordinary skill in the art will recognize that additional ranges of process parameters within the explicit ranges above are contemplated and are within the present disclosure.

The collected metal hydroxide or carbonate powder can then be subjected to a heat treatment to convert the hydroxide or carbonate composition to the corresponding oxide composition with the elimination of water or carbon dioxide. A fluoride, such as $MgF_2$, can be added to introduce a fluoride dopant. Generally, the heat treatment can be performed in an oven, furnace or the like. The heat treatment can be performed in an inert atmosphere or an atmosphere with oxygen present. In some embodiments, the material can be heated to a temperature of at least about 350° C. and in some embodiments from about 400° C. to about 800° C. to convert the hydroxide or carbonate to an oxide. The heat treatment generally can be performed for at least about 15 minutes, in further embodiments from about 30 minutes to 24 hours or longer, and in additional embodiments from about 45 minutes to about 15 hours. A further heat treatment can be performed to improve the crystallinity of the product material. This calcination step for forming the crystalline product generally is performed at temperatures of at least about 650° C., and in some embodiments from about 700° C. to about 1200° C., and in further embodiments from about 700° C. to about 1100° C. The calcination step to improve the structural properties of the powder generally can be performed for at least about 15 minutes, in further embodiments from about 20 minutes to about 30 hours or longer, and in other embodiments from about 1 hour to about 36 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

The lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the hydroxide or carbonate material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH.H_2O$, $LiOH$, $Li_2CO_3$, or a combination thereof, can be mixed with the precipitated metal carbonate or metal hydroxide. The powder mixture is then advanced through the heating step(s) to form the oxide and then the crystalline final product material.

Further details of the hydroxide co-precipitation process are described in the '814 application referenced above. Further details of the carbonate co-precipitation process are described in the '735 application referenced above.

Metal/Metalloid Oxide Coatings

Inert metal oxide coatings can provide surprisingly improved performance when applied in relatively low quantities to lithium metal oxide positive electrode active materials, especially lithium rich active compositions. Performance of lithium ion batteries can be significantly based on the invariance of structure and composition during the lithium topotactic process. A wider voltage window of operation of a lithium ion battery is believed to be linked to more side reactions, some of which may lead to irreversible changes in the material. Of the various techniques employed to reduce side reactions, surface modification via a nano-coating is believed to be very effective because of the improved electrode-electrolyte interface. The electrode-electrolyte interface is one of the most challenging areas of solid state electrochemistry as the whole charge-transfer is determined by the "property or nature" of this subtle interface. The coating can be placed over the particles of the active composition with the objective of providing more facile diffusion for Li, preventing the co-intercalation of anions (mostly $PF^{6-}$), and preventing any irreversible dissolution of cathode active metal ions into electrolyte. Thus, it is believed that the coating can enhance the performance of the lithium ion batteries through the improvements of electrode-electrolyte interface. As described herein, inert metal oxide coatings can be effective to stabilize and improve the performance of lithium rich lithium metal oxide active compositions.

The loss of cathode active metal ions is suspected for the shortening of the cycle life and shelf life of the battery depending on the chemical structure of the positive electrode. For example, uncoated $LiMn_2O_4$ based spinel cathode materials are prone for Mn dissolution even during storage because of the presence of 50% Mn in 3+ which is suspected to be the main ion causing dissolution of manganese. Layered cathode materials such as $LiCoO_2$ can show dissolution of Co ions depending upon the charge voltage. In the case of $LiNiO_2$, there are various hexagonal to orthorhombic phase transitions at different Li intercalation and de-intercalation which leading to large capacity fade. Suppressing the phase transitions, e.g., with an inert metal oxide coating, can result in a lithium ion battery with longer life.

In embodiments with lithium rich cathode material, the above factors are possible to degrade the cell performance. The voltage windows for charge and discharge can be wider than conventional Li battery cathodes. The high capacity cathode on repeated cycling can accumulate $Mn^{3+}$ ions over the cycles which might dissolute leading to a capacity fade. As shown herein, inert metal oxide coatings can be effective to improve the performance of positive electrode active materials, especially lithium rich active compositions. As discussed above, metal fluoride coatings have also been found to improve the performance of positive electrode active materials.

As shown herein, proper adjustment of the metal oxide coatings on the positive electrode active materials can result in excellent specific capacity with correspondingly surprising maintenance of the high capacity upon cycling at a reasonably high charge/discharge rates. The coating thickness has been found to be a significant parameter that contributes to both the structural integrity as well as the electrochemical performance of the cathode material. As indicated in the example section below, thicker coatings can lead to less stable active material and consequently less stable batteries. In some embodiments, the coated lithium metal oxide compositions comprise no more than about 2.0 weight percent, in further embodiments from about 0.025 to about 1.75 weight percent, and in additional embodiments from about 0.05 to about 1.5 weight percent of the metal oxide coating composition. A person of ordinary skill in the art will recognize that additional ranges within the explicit ranges of coating composition above are contemplated and are within the present disclosure. In general, the selected amount of coating material may depend on the properties of the active composition, such as the particle size and particle surface area.

The metal oxide coatings generally comprise compositions that are believed to be essentially inert relative to the electrochemical reactions within the cell. Suitable metal oxides include, for example, aluminum oxide ($Al_2O_3$), bismuth oxide ($Bi_2O_3$), boron oxide ($B_2O_3$), zirconium oxide ($ZrO_2$), magnesium oxide (MgO), chromium oxide ($Cr_2O_3$), magnesium aluminate ($MgAl_2O_4$), gallium oxide ($Ga_2O_3$), silicon oxide ($SiO_2$), tin oxide ($SnO_2$), calcium oxide ($CaO_2$), strontium oxide (SrO), barium oxide (BaO), titanium oxide ($TiO_2$), iron oxide ($Fe_2O_3$), molybdenum oxide ($MoO_3$ and $MoO_2$), cerium oxide ($CeO_2$), lanthanum oxide ($La_2O_3$), zinc oxide (ZnO), lithium aluminum oxide ($LiAlO_2$) or combinations thereof. Aluminum oxide can be desirable due to a low cost and a relative environmentally benign nature.

Appropriate coating materials can both improve the long term cycling performance of the material as well as decrease the irreversible capacity loss (IRCL). While not wanting to be limited by theory, the coatings may stabilize the crystal lattice of the positive electrode active material during the uptake and release of lithium ions so that irreversible changes in the crystal lattice are reduced significantly. Aluminum oxide coatings have been described on layered lithium rich positive electrode particles at an amount of 3 weight percent. See, Wu et al., "High Capacity, Surface-Modified Layered Li[$Li_{(1-x)/3}Mn_{(2-x)/3}Ni_{x/3}Co_{x/3}$]$O_2$ Cathodes with Low Irreversible Capacity Loss," Electrochemical and Solid State Letters, 2006, 9(5), A221-A224, incorporated herein by reference. Improved results have been obtained as described herein using significantly lower amounts of metal oxide coatings. Furthermore, improved cycling is observed with reduced amounts of coating materials with discharging at reasonable rates for actual use.

$Al_2O_3$ exists in many phase forms, α, χ, η, δ, κ, θ, γ, ρ, which arise during the heat treatment of $Al(OH)_3$ or AlO(OH)—[Aluminum oxy-hydroxide]. Each phase of $Al_2O_3$ has a unique crystal structure and properties. FIG. 1 shows the commonly accepted phases of $Al_2O_3$ that are accessed during different firing treatments. The phase of $Al_2O_3$ formed thus can be fine tuned using different firing conditions such as temperature and time. Presumably, the application of the aluminum oxide as a coating can alter the results in this figure, but it is assumed that the figure can provide some guidance on the available phases and their temperature dependence. When applied as a coating in relatively small amounts, it is difficult to directly measure the aluminum oxide coating crystal structure. Results presented in the Examples suggest that moderate temperature phases accessed between 500° C. and 800° C. provide more desirable battery performance at initial cycles when the corresponding positive electrode active materials are used in a lithium-based battery. The different $Al_2O_3$ phases formed at different temperatures may also provide improved stability against interactions or side reactions of the lithium metal oxide material with the electrolyte that can result in dissolution of the transition metals or other unfavorable side interactions.

Combinations of the multiple heat treatments and coating processes can also be used, where an initial $Al_2O_3$ coating or other metal oxide coatings can be formed at lower temperature to encapsulate the cathode material. This initial coating layer can protect the cathode from evaporation of some of the components (Li, transition metals, or dopants) during the higher temperature treatment that can be used to improve the crystallinity of the active core or of the metal oxide coating. Similarly to a two step firing process, a two step coating process with two firings could be used to form the desired phase of $Al_2O_3$ or other metal oxide and still protect against cathode material evaporation during the high temperature treatment. First, an $Al_2O_3$ surface coating would be synthesized and thermal treated at a low temperature followed by a second surface coating (could be the same $Al_2O_3$ or a different material) which can then be fired at a higher temperature. By controlling the phase, e.g., with the calcination temperature, of the $Al_2O_3$, the final cathode material has improved cycling performance, capacity, thermal stability and rate performance.

Generally, the cathode material can be coated a range of metal oxides, such as primary metal oxides or mixed metal oxides, for enhanced electrochemical, thermal and structural properties. The inert metal oxide coating can enhance the structural integrity of various metal ions in the cathode active material resulting in lithium batteries with a relatively long cycle life. The surface coating with a metal oxide or mixed metal oxide on the lithium-rich LMO can enhance the electrode-electrolyte interface by preventing many unwarranted side reactions, which can result in metal ion dissolution and resulting in loss of structural integrity leading to greater capacity fade.

The first cycle irreversible capacity loss for the coated electroactive materials can be decreased at least about 15%, and in further embodiments from about 20% to about 35% relative to the equivalent performance of the uncoated materials. Also, the metal oxide coated materials can have a relatively high tap density. Under controlled conditions of tap rate, drop height and container size, the tap density obtained can be highly reproducible. The tap density of a positive electrode active material described herein can be measured by using graduated measuring cylinders on a commercially available tap machine with pre-determined tapping parameters. The specific method for measurement of the tap density for the measurements described herein is provided explicitly in the Examples. In some embodiments, the tap density of the material can be at least about 1.65 g/mL and in further embodiments from about 1.75 to about 2.75 g/mL. High tap density translates into high overall capacity of a battery given a fixed volume. A person of ordinary skill in the art will recognize that additional ranges of tap density and of decreases in irreversible capacity loss are contemplated and are within the present disclosure.

Methods for Forming the Coatings

The stabilizing metal oxide coating can be formed onto a selected particulate positive electrode active material using commercially suitable methods. In general, the methods involve first associating a coating of a decomposable metal compound with the powder of the active material. Then, the dry powder is heated to decompose the coating to form a metal oxide coating. In some embodiments, the metal oxide coatings can be synthesized using a combination of solution phase deposition approaches combined with a heat treatment to form the oxide. In alternative or additional embodiments, the precursor coating can be applied through a direct drying step.

A solution phase deposition step can involve the deposition of a metal oxide precursor coating. In particular, the precursor can be a sol gel (form of a metal hydroxide), a metal hydroxide, a metal nitrate or a metal carbonate. In general, the hydroxide or carbonate precursors can be precipitated to form the precursor coating. In some embodiments, a soluble nitrate or acetate salt of the metal ion can be mixed with the particles of the lithium metal oxide followed by precipitation of the metal ion with ammonium hydroxide. To facilitate the precipitation, the reaction mixture can then be stirred at elevated temperature e.g. from about 45 to about 90° C., in some embodiments, from about 50 to about 80° C. and in further embodiments, from about 55 to about 75° C. The heating of the precipitation reaction mixture can be performed for a time from about 1 to about 20 hrs, in further embodiments from about 1.5 to about 10 hrs, and in additional embodiments from about 2 to about 8 hrs. Subsequently, the mixture is filtered, and the solid obtained can be subjected to appropriate washing. A person of ordinary skill in the art will recognize that additional ranges of heating temperatures and times are contemplated and are within the present disclosure.

A metal nitrate precursor coating generally cannot be applied through a precipitation process since the metal nitrate compounds are generally soluble. To faun the nitrate based precursor coating, a powder of the active composition is mixed with the metal nitrate solution, and the solution is evaporated to dryness. The solution can be heated to an appropriate temperature to remove the water at a reasonable rate. This approach is described below in the context of the formation of a bismuth oxide coating, although the approach can be generalized since many metal nitrates suitably decompose, with some metal nitrates, such as bismuth nitrate, decomposing at or prior to melting. Alternatively, the solution of soluble nitrate or acetate salt of the metal ion is mixed with the particles of the lithium metal oxide and the mixture is heated directly with stirring at elevated temperature e.g. from about 80 to about 120° C., in some embodiments, from about 85 to about 115° C., and in further embodiments, from about 90 to about 110° C. The heating can be performed for an appropriate amount of time until reaching dryness, such as at least about an hour, in further embodiments from about 1.5 hours to about 8 hours and in additional embodiments for about 2 hours to 6 hours. A person of ordinary skill in the art will recognize that additional ranges of temperature and time within the explicit ranges above are contemplated and are within the present disclosure.

The precursor coated powders, e.g., formed by precipitation or evaporation, are calcined to decompose the precursor coatings into the metal oxide coatings. For the hydroxide precursor coatings generally, the powder can be calcined from about 300 to about 800° C., in some embodiments, from about 350 to about 700° C., and in further embodiments, from about 400 to about 600° C. to form metal oxide coated lithium metal oxide powder. The calcining of the powders initially with a metal hydroxide coating can be performed from about 1 hour to about 20 hours, in further embodiments from about 1.5 to about 15 hours and in other embodiments from about 2 hours to about 10 hours. The dry powder with the metal nitrate precursor coating can be collected and calcined at a temperature from about 250 to about 550° C., in some embodiment from about 300 to about 500° C., and in further embodiments from about 350 to about 450° C., for example, in dry air. The calcination of the powders initially a metal nitrate precursor coating can be performed for a time of at least about 30 minutes, in further embodiments from about 1 hour to about 12 hrs, and in additional embodiments from about 2 to about 6 hrs. A person of ordinary skill in the art will recognize that additional ranges of temperatures and times within the explicit ranges above are contemplated and are within the present disclosure.

As noted above, aluminum oxides can have different crystal structures. Results are presented in the Examples below for the aluminum oxide coatings formed from aluminum hydroxide precursor coatings formed at different calcination temperatures for the oxide coatings. For the formation of aluminum oxide coatings it is generally desirable to heat the aluminum hydroxide precursor coating to temperatures from about 500° C. to about 800° C. Additional ranges of aluminum oxide calcination temperatures within the explicit range above are contemplated and are within the present disclosure. Due to the low coating amounts, it is difficult to observe the aluminum oxide crystal structure, but the results with different calcination temperatures suggests that high temperature phases (perhaps theta-alumina or alpha-alumina) are not desirable with respect to resulting in good battery performance, and moderate temperature phases (perhaps gamma-alumina) can contribute to desirable battery performance.

Lithium Ion Batteries

Figure 2:
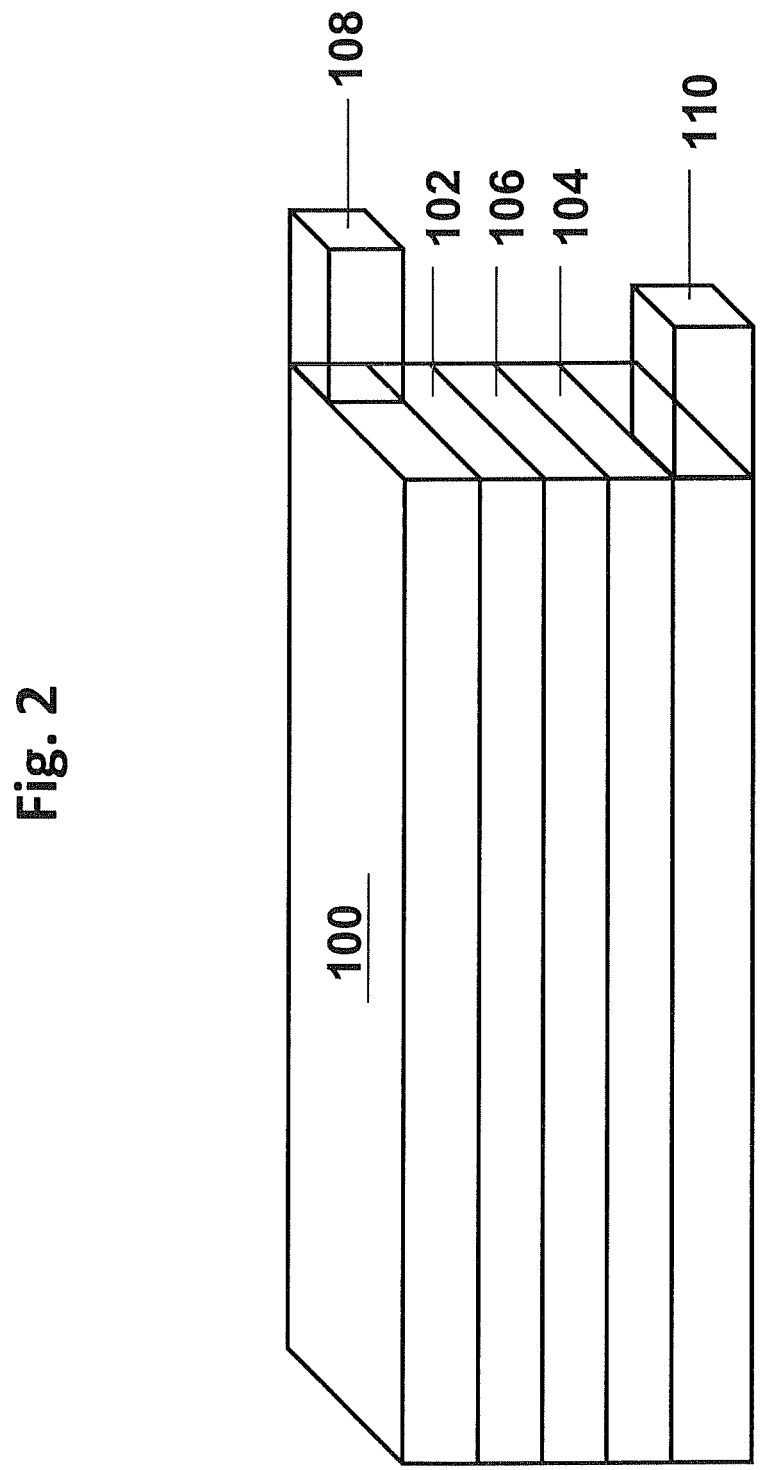
FIG. 2 is a schematic drawing of a battery structure separated from a container.

The lithium ion batteries generally comprise a positive electrode, a negative electrode, a separator between the negative electrode and the positive electrode and an electrolyte comprising lithium ions. The electrodes are generally associated with metal current collectors, such as metal foils. Lithium ion batteries refer to batteries in which the negative electrode active material is a material that takes up lithium during charging and releases lithium during discharging. Referring to FIG. 2, a battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104.

Lithium has been used in both primary and secondary batteries. An attractive feature of lithium metal is its light weight and the fact that it is the most electropositive metal, and aspects of these features can be advantageously captured in lithium ion batteries also. Certain forms of metals, metal oxides, and carbon materials are known to incorporate lithium ions into the structure through intercalation, alloying or similar mechanisms. Desirable mixed metal oxides are described further herein to function as electroactive materials for positive electrodes in secondary lithium ion batteries. Lithium ion batteries refer to batteries in which the negative electrode active material is a material that takes up lithium during charging and releases lithium during discharging. If lithium metal itself is used as the anode, the resulting battery generally is simply referred to as a lithium battery.

The nature of the negative electrode intercalation material influences the resulting voltage of the battery since the voltage is the difference between the half cell potentials at the cathode and anode. Suitable negative electrode lithium intercalation compositions can include, for example, graphite, synthetic graphite, coke, fullerenes, niobium pentoxide, tin alloys, silicon, titanium oxide, tin oxide, and lithium titanium oxide, such as $Li_xTiO_2$, $0.5<x\leq1$ or $Li_{1+x}Ti_{2-x}O_4$, $0\leq x\leq\frac{1}{3}$. Additional negative electrode materials are described in published U.S. patent applications 2010/0119942 to Kumar, entitled "Composite Compositions, Negative Electrodes with Composite Compositions and Corresponding Batteries," and 2009/0305131 to Kumar et al., entitled "High Energy Lithium Ion Batteries with Particular Negative Electrode Compositions," both of which are incorporated herein by reference.

The positive electrode active compositions and negative electrode active compositions generally are powder compositions that are held together in the corresponding electrode with a polymer binder. The binder provides ionic conductivity to the active particles when in contact with the electrolyte. Suitable polymer binders include, for example, polyvinylidine fluoride, polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. The particle loading in the binder can be large, such as greater than about 80 weight percent. To form the electrode, the powders can be blended with the polymer in a suitable liquid, such as a solvent for the polymer. The resulting paste can be pressed into the electrode structure. In some embodiments, the batteries can be constructed based on the method described in published U.S. patent application 2009/0263707 to Buckley et al, entitled "High Energy Lithium Ion Secondary Batteries", incorporated herein by reference.

The positive electrode composition, and possibly the negative electrode composition, generally also comprises an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, a positive electrode can comprise from about 1 weight percent to about 25 weight percent, and in further embodiments from about 2 weight percent to about 15 weight percent distinct electrically conductive powder. A person of ordinary skill in the art will recognize that additional ranges of amounts of electrically conductive powders within the explicit ranges above are contemplated and are within the present disclosure.

The electrode generally is associated with an electrically conductive current collector to facilitate the flow of electrons between the electrode and an exterior circuit. The current collector can comprise metal, such as a metal foil or a metal grid. In some embodiments, the current collector can be formed from nickel, aluminum, stainless steel, copper or the like. The electrode material can be cast as a thin film onto the current collector. The electrode material with the current collector can then be dried, for example in an oven, to remove solvent from the electrode. In some embodiments, the dried electrode material in contact with the current collector foil or other structure can be subjected to a pressure, such as, from about 2 to about 10 kg/cm² (kilograms per square centimeter).

The separator is located between the positive electrode and the negative electrode. The separator is electrically insulating while providing for at least selected ion conduction between the two electrodes. A variety of materials can be used as separators. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Also, ceramic-polymer composite materials have been developed for separator applications. These composite separators can be stable at higher temperatures, and the composite materials can significantly reduce the fire risk. The polymer-ceramic composites for separator materials are described further in U.S. patent application 2005/0031942A to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl)methide, lithium tetrafluoroborate, lithium perchlorate, lithium tetrachloroaluminate, lithium chloride, lithium difluoro oxalato borate, and combinations thereof. Traditionally, the electrolyte comprises a 1 M concentration of the lithium salts, although greater or lesser concentrations can be used.

For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol) dimethyl ether), diglyme (diethylene glycol dimethyl ether), DIVE (glyme or 1,2-dimethyloxyethane or ethylene glycol dimethyl ether), nitromethane and mixtures thereof. Particularly useful solvents for high voltage lithium-ion batteries are described further in copending U.S. patent application Ser. No. 12/630,992 filed on Dec. 4, 2009 to Amiruddin et al., entitled "Lithium Ion Battery With High Voltage Electrolytes and Additives," incorporated herein by reference.

The electrodes described herein can be incorporated into various commercial battery designs. For example, the cathode compositions can be used for prismatic shaped batteries, wound cylindrical batteries, coin batteries or other reasonable battery shapes. The batteries can comprise a single cathode structure or a plurality of cathode structures assembled in parallel and/or series electrical connection(s). While the positive electrode active materials can be used in batteries for primary, or single charge use, the resulting batteries generally have desirable cycling properties for secondary battery use over multiple cycling of the batteries.

In some embodiments, the positive electrode and negative electrode can be stacked with the separator between them, and the resulting stacked structure can be placed into a cylindrical or prismatic configuration to form the battery structure. Appropriate electrically conductive tabs can be welded or the like to the current collectors, and the resulting jellyroll or stack structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used.

Battery Performance

The results for battery performance using the metal oxide coated positive electrode active powders confirm a conclusion that surprisingly small amounts of coating material provide the best battery performance based on specific capacity at moderate rates. In some embodiments, the lithium ion batteries described herein can exhibit a specific discharge capacity of at least about 260 mAh/g and in some embodiments at least about 270 mAh/g at a discharge rate of C/3 when discharged from 4.6V to 2.0V. Also, the specific discharge capacity at the 50th cycle can be at least 230 mAh/g and in further embodiments at least about 245 mAh/g, when discharged from 4.6V to 2.0V at a rate of C/3 at room temperature. A person of ordinary skill in the art will recognize that additional ranges of specific capacity and cycling capacity within the specific ranges above are contemplated and are within the present disclosure.

EXAMPLES

Example 1

Synthesis of the Lithium Metal Oxide Active Material

This example demonstrates the formation of a desired positive electrode active material using a carbonate or hydroxide co-precipitation process. Stoichiometric amounts of metal precursors were dissolved in distilled water to form an aqueous solution with the metal salts in the desired molar ratios. Separately, an aqueous solution containing $Na_2CO_3$ and/or $NH_4OH$ was prepared. For the formation of the samples, one or both solutions were gradually added to a reaction vessel to form metal carbonate or hydroxide precipitates. The reaction mixture was stirred, and the temperature of the reaction mixture was kept between room temperature and 80° C. The pH of the reaction mixture was in the range from 6-12. In general, the aqueous transition metal solution had a concentration from 1 M to 3 M, and the aqueous $Na_2CO_3/NH_4OH$ solution had a $Na_2CO_3$ concentration of 1 M to 4 M and/or a $NH_4OH$ concentration of 0.2-2M. The metal carbonate or hydroxide precipitate was filtered, washed multiple times with distilled water, and dried at 110° C. for about 16 hrs to form a metal carbonate or hydroxide powder. Specific ranges of reaction conditions for the preparation of the samples are further outlined in Table 1, where the solution may not include both $Na_2CO_3$ and $NH_4OH$.

TABLE 1

| Reaction Process Condition | Values |
| --- | --- |
| Reaction pH | 6.0-12.0 |
| Reaction time | 0.1-24 hr |
| Reactor type | Batch |
| Reactor agitation speed | 200-1400 rpm |
| Reaction temperature | RT-80° C. |
| Concentration of the metal salts | 1-3M |
| Concentration of $Na_2CO_3$ (precipitating agent) | 1-4M |
| Concentration of $NH_4OH$ (chelating agent) | 0.2-2M |
| Flow rate of the metal salts | 1-100 mL/min |
| Flow rate of $Na_2CO_3$ & $NH_4OH$ | 1-100 mL/min |

An appropriate amount of $Li_2CO_3$ powder was combined with the dried metal carbonate or hydroxide powder and thoroughly mixed with a Jar Mill, double planetary mixer, or dry powder rotary mixer to form a homogeneous powder mixture. A portion, e.g. 5 grains, of the homogenized powders was calcined in a step to form the oxide, followed by an additional mixing step to further homogenize the powder. The further homogenized powder was again calcined to form the highly crystalline lithium composite oxide. Specific ranges of calcination conditions are further outlined in Table 2 (scfh=a standard cubic foot per hour).

TABLE 2

| Calcination Process Condition | | Values |
| --- | --- | --- |
| $1^{st}$ Step | temperature | 400-800° C. |
|  | time | 1-24 hr |
|  | protective gas | Nitrogen or Air |
|  | Flow rate of protective gas | 0-50 scfh |
| $2^{nd}$ Step | temperature | 700-1100° C. |
|  | time | 1-36 hr |
|  | protective gas | Nitrogen or Air |
|  | Flow rate of protective gas | 0-50 scfh |

The lithium metal oxide (LMO) positive electrode composite material particles thus formed generally have a substantially spherical shape and are relatively homogenous in size. The product composition was assumed to correspond to the portions of the metal reactants used to form the composition with the oxygen adjusting to yield the overall targeted oxidation state. As discussed in the above sections, the overall formula for these LMO compositions can be written as x $Li_2MnO_3 \cdot (1-x) Li Ni_u Co_w Mn_v O_2$ (1) or $Li_{1+b} Ni_\alpha Co_\gamma Mn_\beta O_2$ (2). Samples 1-8 were synthesized using the procedure outlined herein and the corresponding u, v, w, and α, γ, β values are listed in Table 3 below, including two sets of compositions. For the first set of compositions, variations of compositions of samples 2-8 were synthesized having u=v. For the second set of compositions, sample 1 was synthesized with u does not equal to v.

TABLE 3

| Composition | x in $xLi_2MnO_3 \cdot (1 - x)LiMO_2$ | Mn % Transition Metal |
| --- | --- | --- |
| 1 | 0.5 | 65.63 |
| 2 | 0.5 | 68.75 |
| 3 | 0.5 | 67.25 |
| 4 | 0.5 | 65.62 |
| 5 | 0.5 | 64.12 |
| 6 | 0.3 | 54.02 |
| 7 | 0.3 | 49.66 |
| 8 | 0.1 | 43.75 |

Compositions from both sets were coated with metal/metalloid oxide as a stabilization composition as described in Examples 2, 4, and 6 below. The coated and uncoated compositions were then used to form coin cell batteries following the procedure outlined in Example 3. The coin cell batteries were tested, and the results are described below in Examples 3, 5, and 7.

Example 2

Coating with $Al_2O_3$

This example describes the formation of an aluminum oxide coating on the lithium rich positive electrode active materials from Example 1 with the formula of sample 1 from Table 3. The aluminum oxide surface coating was formed using an aluminum hydroxide precipitation reaction followed by calcination. Generally, for a coating a selected amount of aluminum nitrate was first dissolved in the appropriate amount of water to form a solution of aluminum nitrate. To this solution of aluminum nitrate, the lithium metal oxide (LMO) particles from Example 1 were dispersed under constant stirring to form a well-dispersed mixture. To the well-dispersed mixture, an appropriate amount of ammonium hydroxide was added drop-wise resulting in the precipitation of aluminum hydroxide to coat the LMO particles. After the addition of ammonium hydroxide, the mixture was heated roughly at 60° C. for a period of time ranging from 2 to 10 h. Subsequently, the mixture was filtered, and the solid obtained was subjected to copious washing to form a material with precipitated aluminum hydroxide on the active LMO material.

Figure 3:
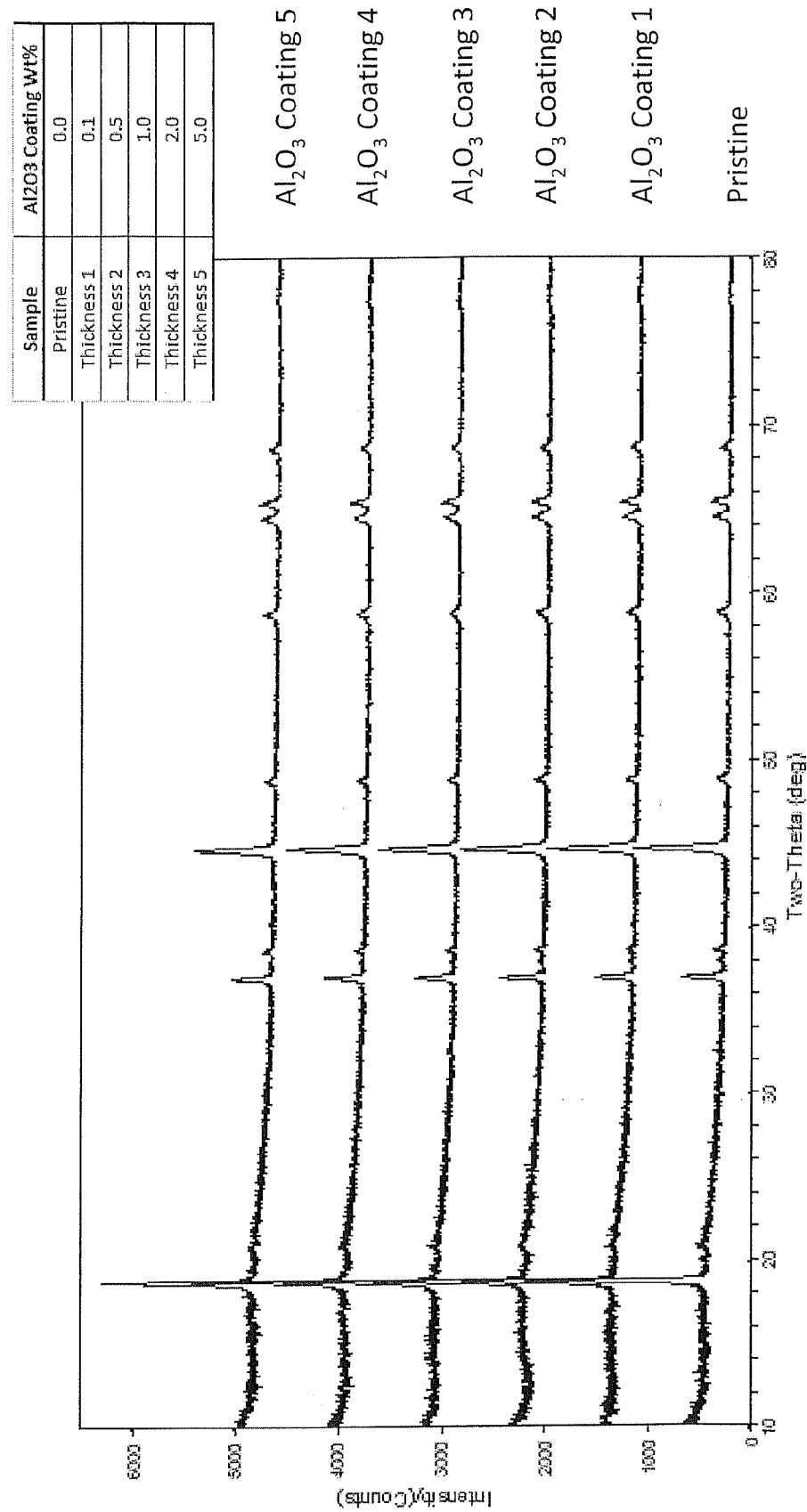
FIG. 3 is XRD of pristine lithium metal oxide (LMO) and LMO with different $Al_2O_3$ coating thicknesses.

Then, the material with the precipitate aluminum hydroxide was calcined at for 4-12 hours to form aluminum oxide coated LMO powder. A portion of the samples with 0.5 weight percent aluminum oxide were calcined at selected temperatures over a reasonable range to explore the effects of temperature on subsequent battery performance with the aluminum oxide coated materials. Another portion of the samples were coated with selected amounts of aluminum oxide coating that was calcined at temperatures from 500-800° C. to evaluate the battery performance as a function of the amount of aluminum oxide coating. The materials coated with aluminum oxide were examined using x-ray diffraction. The x-ray diffractograms are shown in FIG. 3 for the uncoated material along with 5 samples with different amounts of aluminum oxide coating material. As shown by the x-ray diffractograms of FIG. 3, the aluminum oxide coatings did not significantly alter the crystal structure of the core lithium metal oxide material.

Figure 4:
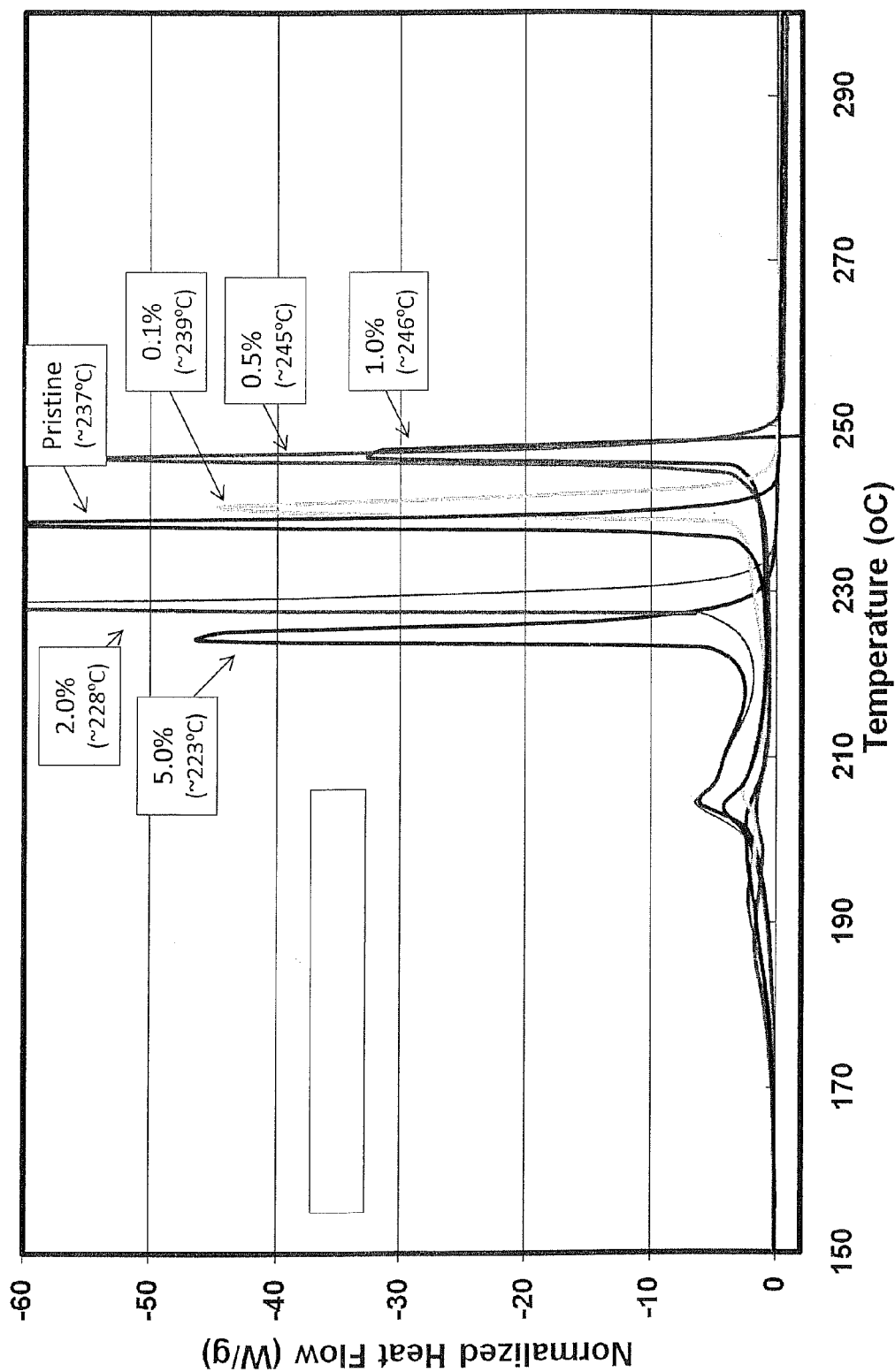
FIG. 4 is DSC studies of pristine LMO and lithium metal oxide with different $Al_2O_3$ coating thicknesses.

The stability of the cathode active materials was studied using differential scanning calorimetry (DSC). The DSC results are shown in FIG. 4 for uncoated lithium metal oxide particles and particles with 5 different amounts of coating material. Peaks in the heat flow as a function of temperature indicate a phase transition or similar change of the material. As seen in FIG. 4, particles with thinner $Al_2O_3$ coating exhibited a greater heat stability relative to the uncoated powder, while particles with thicker coatings of 2 weigh percent and 5 weight percent exhibited a deceased thermal stability relative to the uncoated powders. Therefore, it is expected that batteries formed with the materials having a thinner oxide coating should exhibit greater temperature stability at higher temperatures if the LMO materials with a thin oxide coating are used in the positive electrodes.

Tap density measurements are also presented in Table 4. An AUTOTAP™ machine from Quantachrome Instruments was used to measure tap density of the samples. In a typical measurement process, a 4-10 gram quantity of sample powder was weighed out and placed in a graduated cylinder (10 mL). The cylinder was then mounted on a wheel of the AUTOTAP™ that taps at a tap rate of 260 $min^{-1}$ with a drop height of 3 mm. After 2000 taps the volume of the powder was determined by using the measurement markings on the graduated cylinder. The initial weight of the sample divided by the measured volume after tapping gives the tap density in g/mL unit of the sample.

Example 3

Battery Performance with Aluminum Oxide Coated Materials with Selected Amounts of Coating This example describes the performance of the aluminum oxide coated materials in coin cell batteries in which results are obtained with different amounts of coating material to evaluate battery performance as a function of the amount of aluminum oxide coating material.

To test the performance of the materials, the lithium metal oxide (LMO) powders with or without an aluminum oxide coating from Example 2 with selected amounts of coating material were mixed thoroughly with acetylene black (Super P™ from Timcal, Ltd, Switzerland) and graphite (KS 6™ from Timcal, Ltd) to form a homogeneous powder mixture. Separately, Polyvinylidene fluoride PVDF (KF1300™ from Kureha Corp., Japan) was mixed with N-methyl-pyrrolidone NMP (Sigma-Aldrich) and stirred overnight to form a PVDF-NMP solution. The homogeneous powder mixture was then added to the PVDF-NMP solution and mixed for about 2 hours to form a homogeneous slurry. The slurry was applied onto an aluminum foil current collector to form a thin wet film.

A positive electrode material was formed by drying the aluminum foil current collector with the thin wet film in vacuum oven at 110° C. for about two hours to remove NMP. The positive electrode material was pressed between rollers of a sheet mill to obtain a positive electrode with desired thickness. The mixture comprised at least about 75 weight percent active metal oxide, at least about 3 weight percent acetylene black, at least about 1 weight percent graphite, and at least about 2 weight percent polymer binder.

The positive electrode was placed inside an argon filled glove box for the fabrication of the coin cell batteries. Lithium foil (FMC Lithium) having thickness of roughly 125 microns was used as a negative electrode. The electrolyte was selected to be stable at high voltages, and appropriate electrolytes are described in copending U.S. patent application Ser. No. 12/630,992 to Amiruddin et al., entitled "Lithium Ion Battery With High Voltage Electrolytes and Additives," incorporated herein by reference. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles.

A first set of batteries were cycled between 4.6V and 2.0V using a rate of C/10 for cycles 1 and 2, C/5 for cycles 3 and 4, and C/3 for cycles 5-55. A summary of the average voltage, the 1st cycle charge specific capacity, the 1st cycle discharge specific capacity and irreversible capacity loss (IRCL) are presented in Table 4.

TABLE 4

| Sample | Tap Density (g/cc) | Average Voltage (V) | Charge C/10 (mAh/g) | Discharge C/10 (mAh/g) | IRCL (mAh/g) |
|---|---|---|---|---|---|
| Pristine | 1.832 | 3.625 | 320.08 | 255.78 | 64.29 |
| 0.1 wt % $Al_2O_3$ | 1.740 | 3.616 | 330.69 | 270.98 | 59.71 |
| 0.2 wt % $Al_2O_3$ | 1.680 | 3.590 | 329.04 | 276.36 | 52.69 |
| 0.3 wt % $Al_2O_3$ | 1.606 | 3.588 | 325.80 | 275.65 | 50.15 |
| 0.4 wt % $Al_2O_3$ | 1.702 | 3.544 | 313.30 | 265.69 | 47.61 |
| 0.5 wt % $Al_2O_3$ | 1.690 | 3.587 | 315.99 | 269.65 | 46.34 |
| 1.0 wt % $Al_2O_3$ | 1.680 | 3.511 | 308.73 | 265.92 | 42.80 |
| 2.0 wt % $Al_2O_3$ | 1.520 | 3.510 | 291.88 | 249.94 | 41.94 |
| 5.0 wt % $Al_2O_3$ | 1.420 | 3.422 | 274.17 | 232.18 | 41.99 |

Figure 5A:
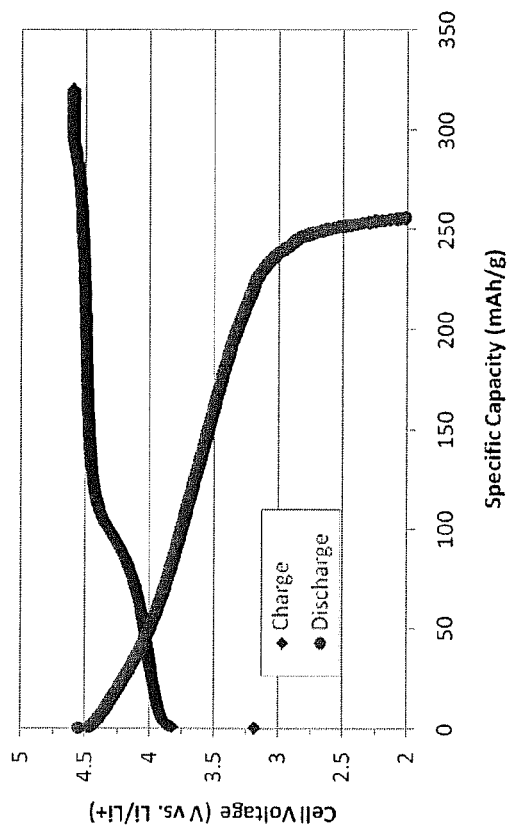
FIGS. 5A and 5B are graphs of cell voltage as a function of specific capacity for the first cycle charge and discharge at a rate of C/10 for coin cells formed from LMO uncoated (A) and coated with 0.5 weight percent aluminum oxide (B).
Figure 5B:
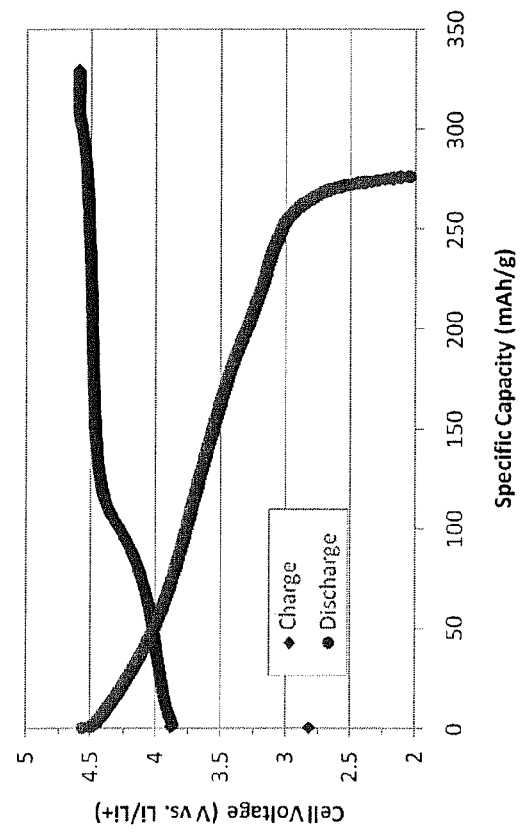
Figure 6A:
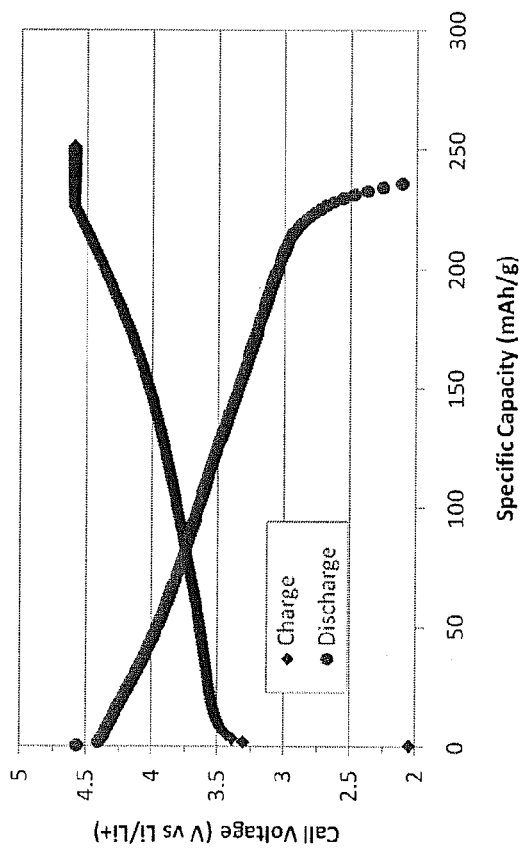
FIGS. 6A and 6B are graphs of cell voltage as a function of specific capacity for the fifth cycle charge and discharge at a rate of C/3 for coin cells formed from LMO uncoated (A) and coated with 0.5 weight percent aluminum oxide (B).
Figure 6B:
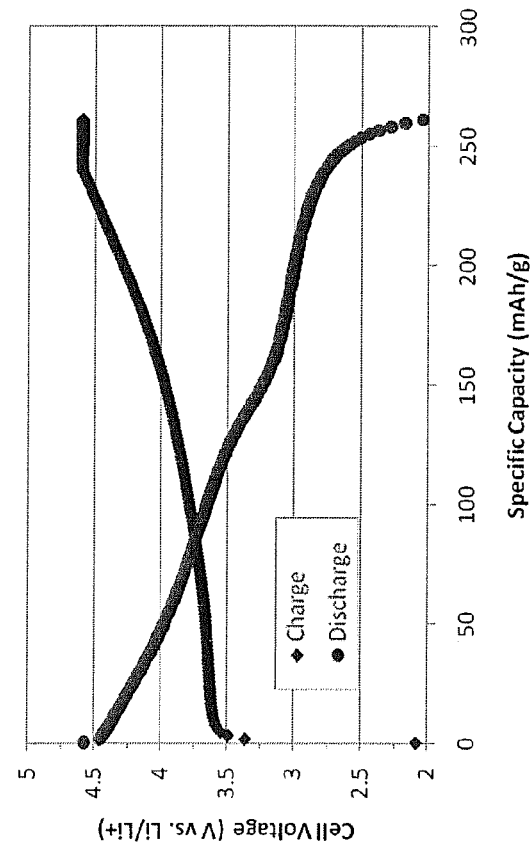

Plots of the first cycle (C/10 rate) voltage as a function of charge specific capacity and discharge specific capacity are shown in FIGS. 5A and 5B for batteries formed with uncoated LMO and for batteries formed with 0.2 weight percent Al₂O₃ coated LMO, respectively. Plots of the fifth cycle (C/3 rate) voltage as a function of charge specific capacity and discharge specific capacity are shown in FIGS. 6A and 6B for batteries formed with uncoated LMO and for batteries formed with 0.2 weight percent Al₂O₃ coated LMO, respectively.

Figure 7:
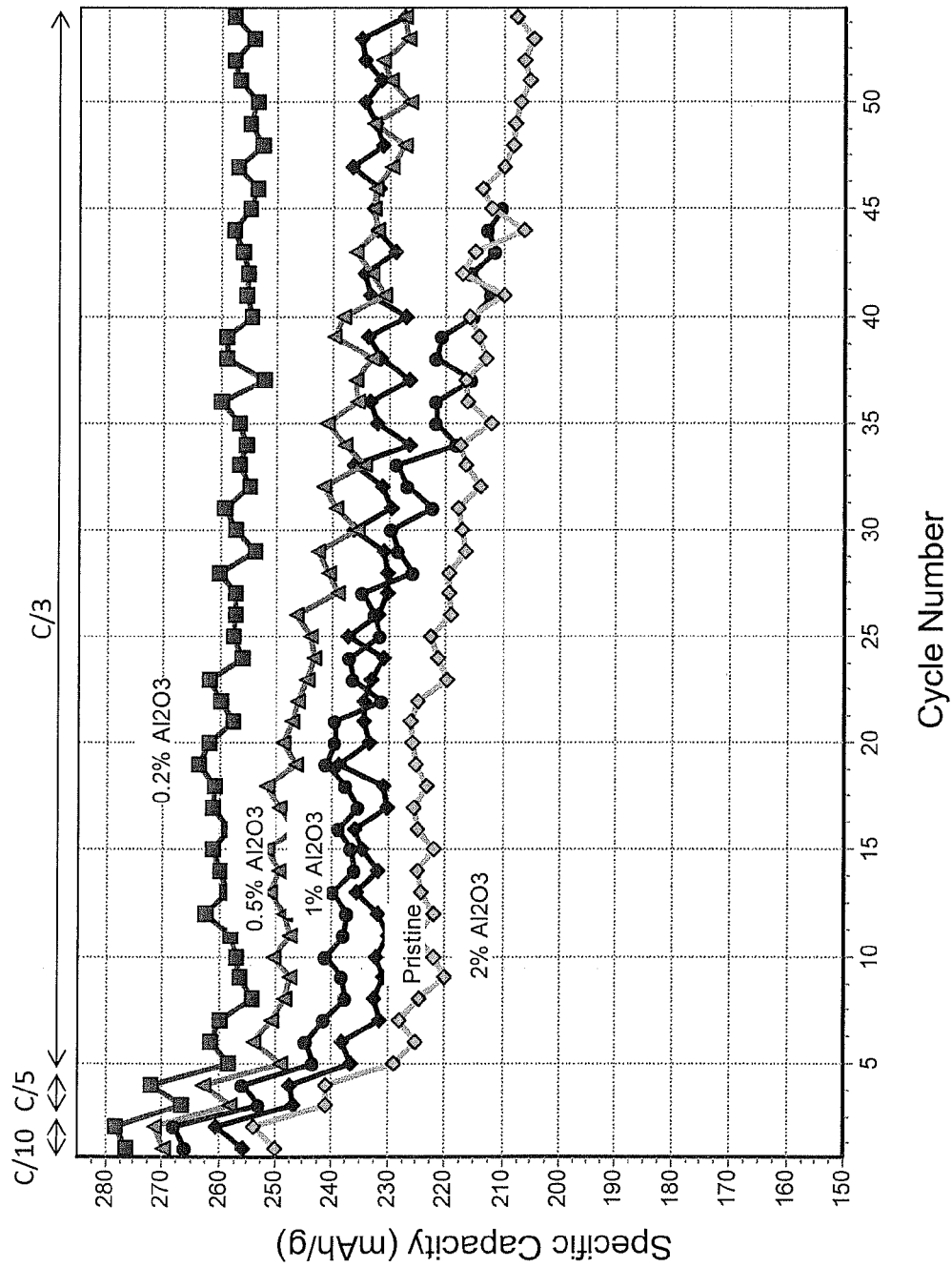
FIG. 7 is a set of plots of specific discharge capacity versus cycle number of pristine LMO and LMO with different $Al_2O_3$ coating thicknesses cycled at 0.1 C for the first two cycles, 0.2 C for cycle numbers three and four, and 0.33 C for cycle numbers 5-54.

Plots of the resulting discharge specific capacity as a function of cycle number are presented in FIG. 7 of an uncoated, i.e., pristine material, and for a positive electrode active material with one of four different amounts of Al₂O₃ coating of 0.2 wt %, 0.5 wt %, 1 wt %, and 2 wt %. The best results were obtained for the sample with the lower amount of coating, 0.2 weight percent. The sample with the most coating material, 2 weight percent, had a specific capacity less than the battery formed with the uncoated sample. The battery formed with the sample having a 0.2 weight percent coating exhibited surprisingly excellent performance out to 55 cycles at a discharge rate of C/3. Specifically, the sample had a discharge capacity at cycle 55 that was virtually the same as the capacity at cycle 5.

Figure 8:
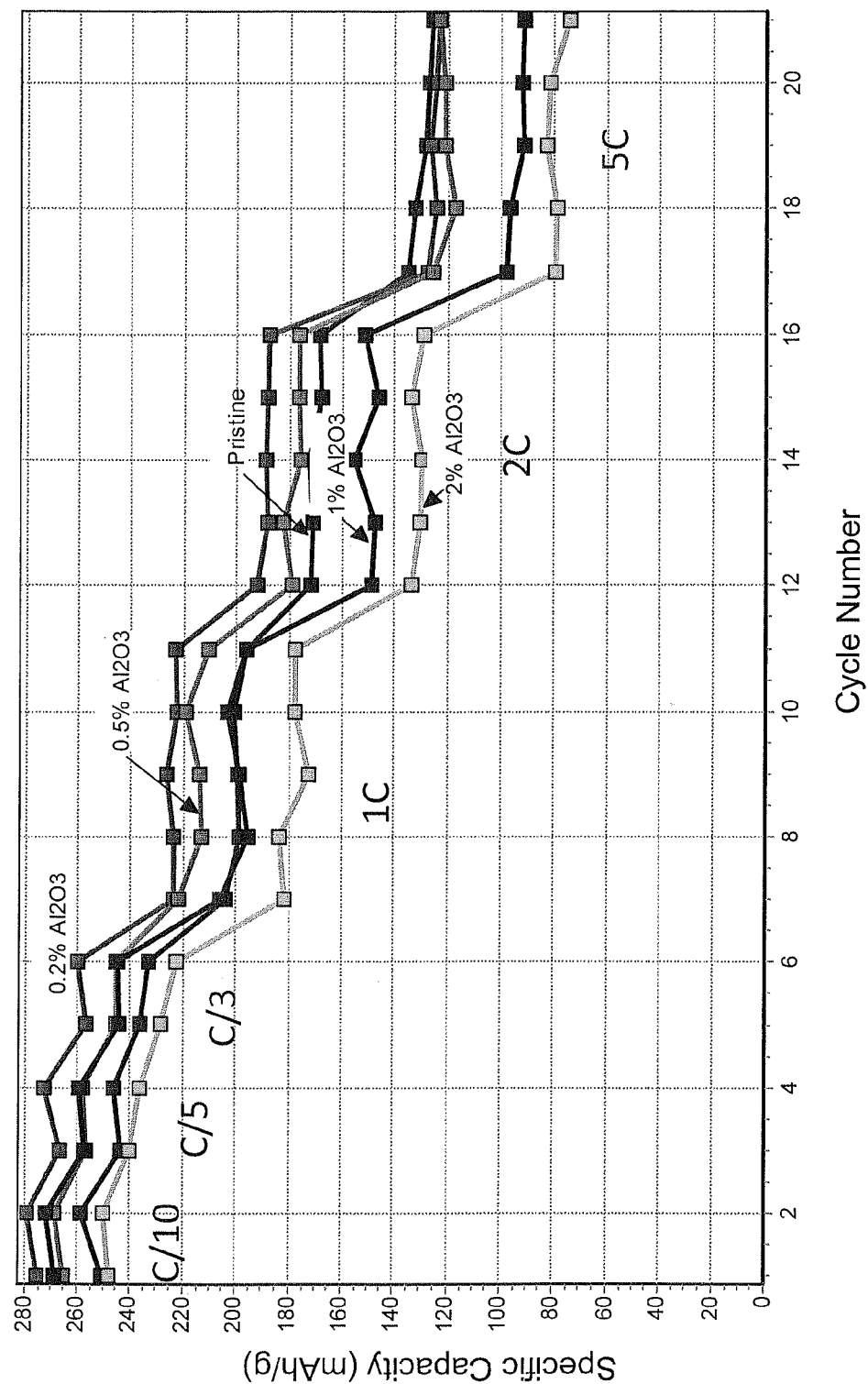
FIG. 8 is a set of plots of specific discharge capacity versus cycle number of pristine LMO and LMO with different $Al_2O_3$ coating thicknesses cycled at 0.1 C for the first two cycles, 0.2 C for cycle numbers three and four, 0.33 C for cycle numbers five and six, 1.0 C for cycle numbers 7 to 11, 2.0 C for cycle numbers 12 to 16, and 5.0 C for cycle numbers 17 to 21.

Another set of batteries were cycled using a different cycling protocol. Similar results were obtained with the second cycling protocol. Referring to FIG. 8, these batteries were cycled at a discharge rate of C/10 for cycles 1 and 2, C/5 for cycles 3 and 4, C/3 for cycles 5 and 6, 1 C for cycles 7-11, 2 C for cycles 12-16, and 5 C for cycles 17-21. Plots of specific discharge capacity as a function of cycle number are plotted in FIG. 8. The sample with a 0.2 weight percent coating exhibited a battery capacity greater than the other coated samples at all of the rates.

Example 4

Battery Performance with Aluminum Oxide Coated Materials with the Coating Fired Over a Range of Temperatures This example describes the performance of the aluminum oxide coated materials in coin cell batteries in which results are obtained with coating material that was calcined at different temperatures to evaluate battery performance as a function of the processing temperature for the aluminum oxide coating material.

Figure 9:
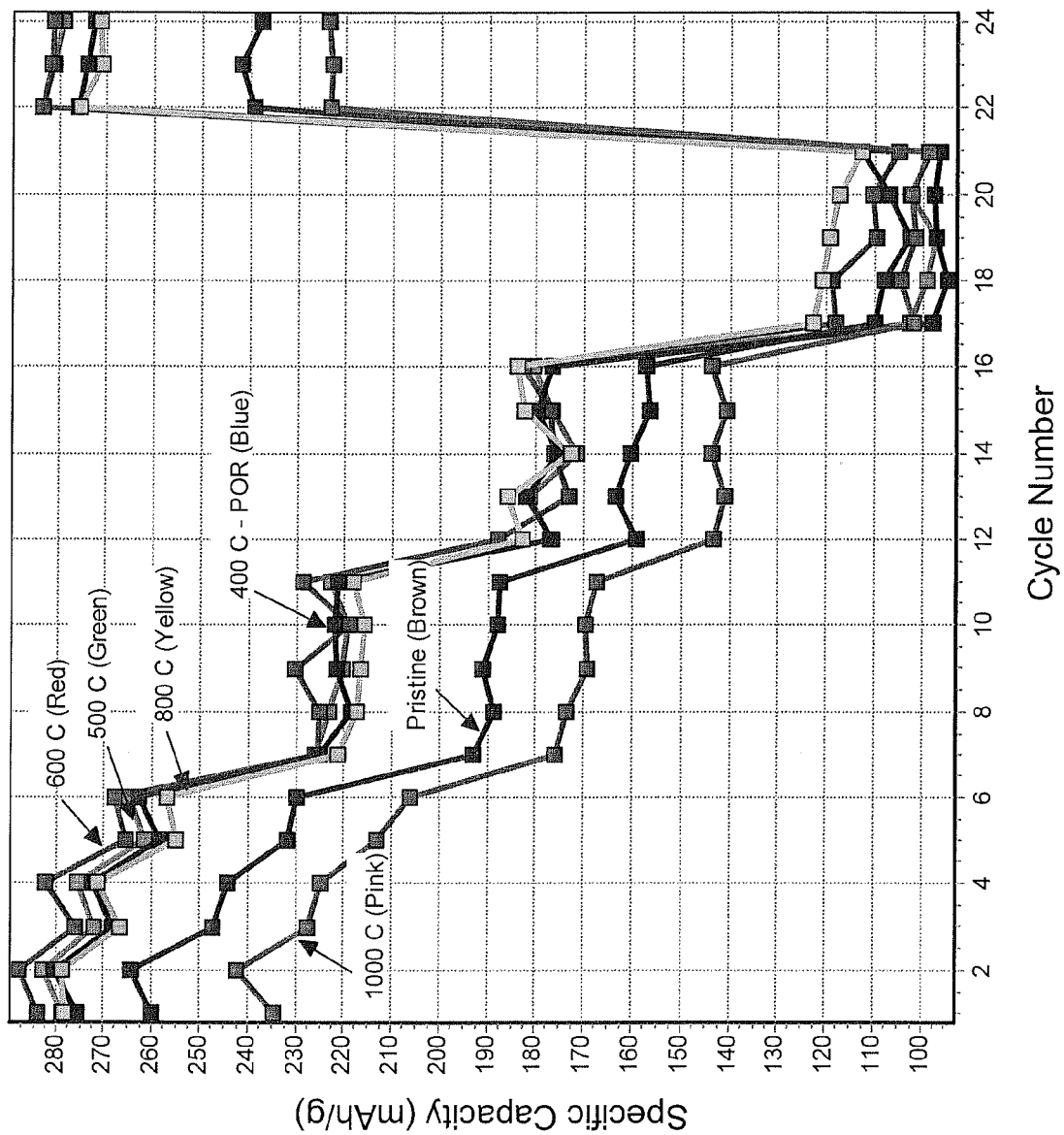
FIG. 9 is graph with plots of specific discharge capacity as a function of cycle number for coin cells formed with LMO uncoated or coated with 0.5 weight percent aluminum oxide that is calcined at 400, 500, 600, 800 or 1000° C., in which the discharge rates are 0.1 C for the first two cycles, 0.2 C for cycle numbers three and four, 0.33 C for cycle numbers five and six, 1.0 C for cycle numbers 7 to 11, 2.0 C for cycle numbers 12 to 16, 5.0 C for cycle numbers 17 to 21 and 0.2 C for cycles 22-24.
Figure 11:
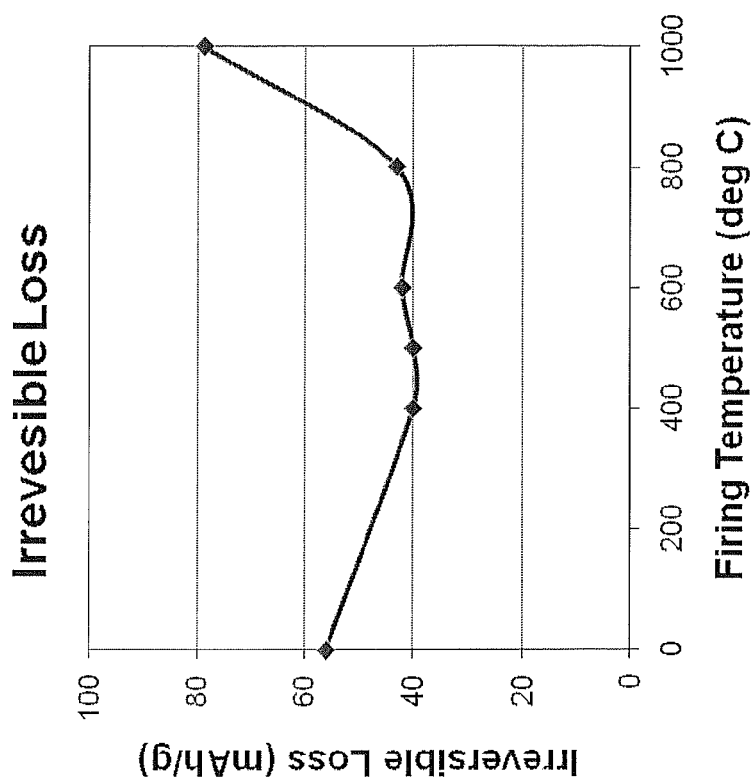
FIG. 11 is a plot of first cycle irreversible capacity loss as a function of calcination temperatures for aluminum oxide coatings on the LMO.
Figure 10:
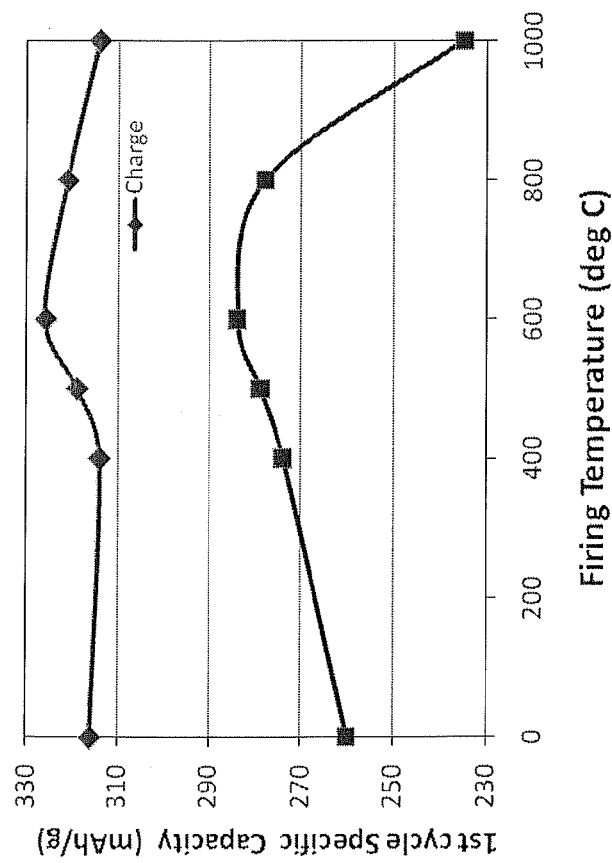
FIG. 10 is a plot of first cycle charge and discharge specific capacities as a function of calcination temperatures for the aluminum oxide coatings on the LMO.

To test the performance of the materials, coin cell batteries were formed with the lithium metal oxide (LMO) powders with or without an aluminum oxide coating from Example 2 in which the coating material was calcined at 400, 500, 600, 800 or 1000° C. The samples had 0.5 weight percent aluminum oxide coating. The LMO powders were formed into coin cells as described in Example 3, and the resulting batteries were cycled at a discharge rate of C/10 for cycles 1 and 2, C/5 for cycles 3 and 4, C/3 for cycles 5 and 6, 1 C for cycles 7-11, 2 C for cycles 12-16, 5 C for cycles 17-21 and C/5 for cycles 22-24. Specific capacity as a function of cycle number is plotted in FIG. 9. The specific capacity results for the coated materials calcined at 1000° C. were generally worse than for the uncoated samples. The specific capacities for the coated samples calcined at 500° C. and 600° C. generally had very good specific capacities. The first cycle specific charge and discharge capacities are plotted as a function of the calcination temperature for the coating in FIG. 10. The first cycle irreversible capacity losses are plotted as a function of the calcination temperature for the coating in FIG. 11. Performance results for the batteries are summarized in Table 5.

TABLE 5

| Condition | C/10-Charge | C/10-Discharge | IRCL | C/3-Discharge | 1C-Discharge | 2C-Discharge |
|---|---|---|---|---|---|---|
| Pristine | 316 | 260 | 56 | 232 | 193 | 159 |
| 400/5 h | 314 | 274 | 40 | 260 | 223 | 174 |
| 500/5 h | 319 | 279 | 40 | 262 | 226 | 177 |
| 600 C./5 h | 326 | 284 | 42 | 266 | 225 | 188 |
| 800 C./5 h | 321 | 278 | 43 | 255 | 221 | 183 |
| 1000 C./5 h | 314 | 235 | 79 | 213 | 177 | 143 |

Example 5

Coating with Bismuth Oxide

This example describes the formation of a bismuth oxide coating on the high capacity lithium rich metal oxides formed as described in Example 1 with the formula of sample 1 of Table 3.

A bismuth oxide coating over the high capacity cathode material was performed by drying a bismuth nitrate onto the active lithium metal oxide followed by a calcination step. Specifically, bismuth nitrate was dissolved in a selected amount of water, and the cathode material to be coated with Bi₂O₃ was dispersed in the bismuth nitrate solution. Then, this mixture was heated at 80-100° C. for ~2 h until reaching dryness. The dry powder was collected and fired at 300-400° C. for 2 h in a conventional muffle furnace in a dry air to form the bismuth oxide coating.

Figure 12:
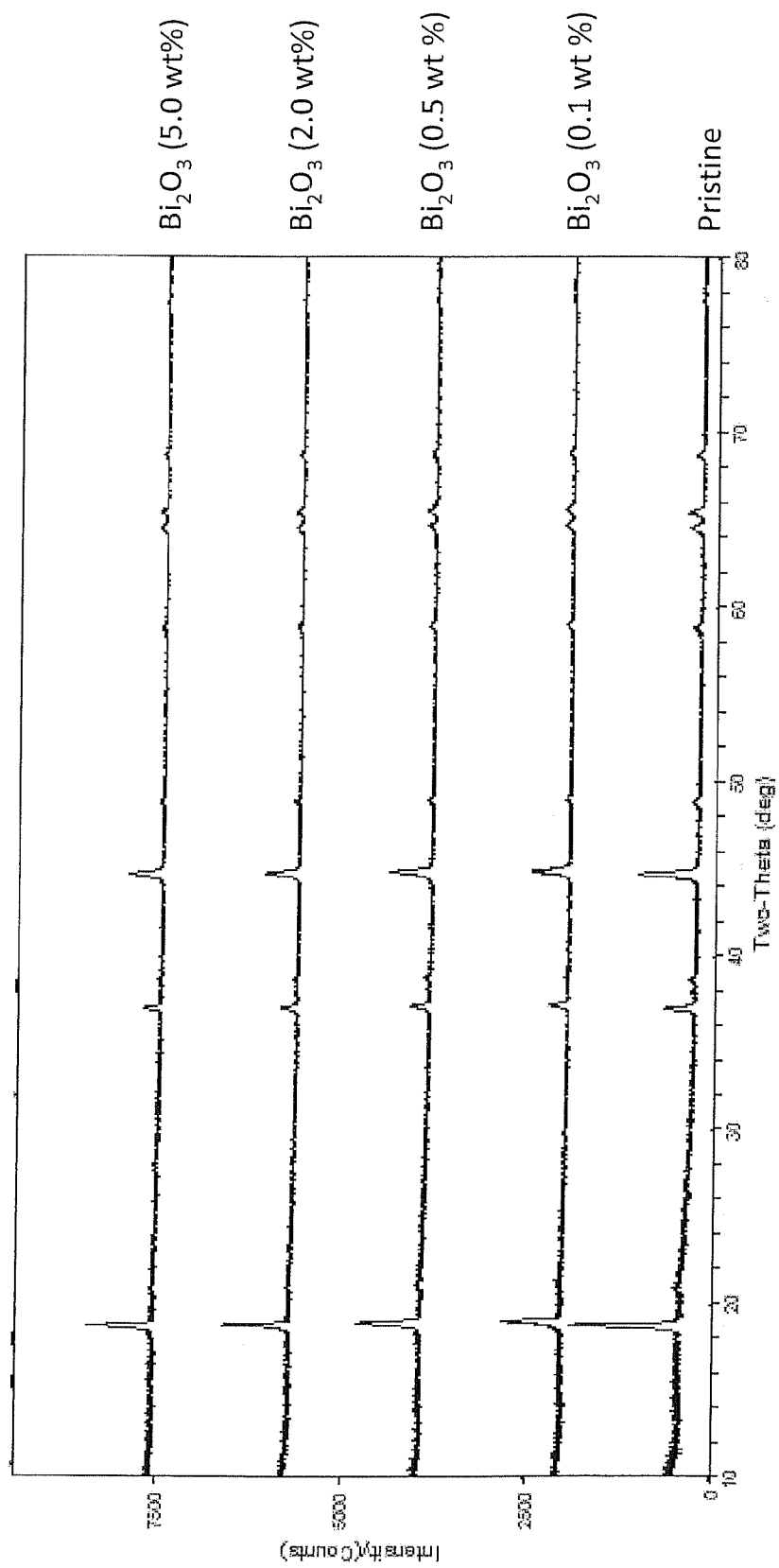
FIG. 12 is XRD of pristine LMO and LMO with different $Bi_2O_3$ coating thicknesses.

The materials coated with bismuth oxide are examined using x-ray diffraction. The x-ray diffractograms are shown in FIG. 12 for the uncoated material along with 4 samples with different amounts of bismuth oxide coating of the same material. Samples were prepared with about 0.1, 0.5, 2.0 and 5.0 weight percent coating material. As shown from the diffractograms in FIG. 12, the coatings did not significantly alter the crystal structure of the materials.

Example 6

Battery Performance with Bismuth Oxide Coated Materials

This example provides battery performance results for batteries incorporating the positive electrode active materials having bismuth oxide coatings from Example 4.

Figure 13:
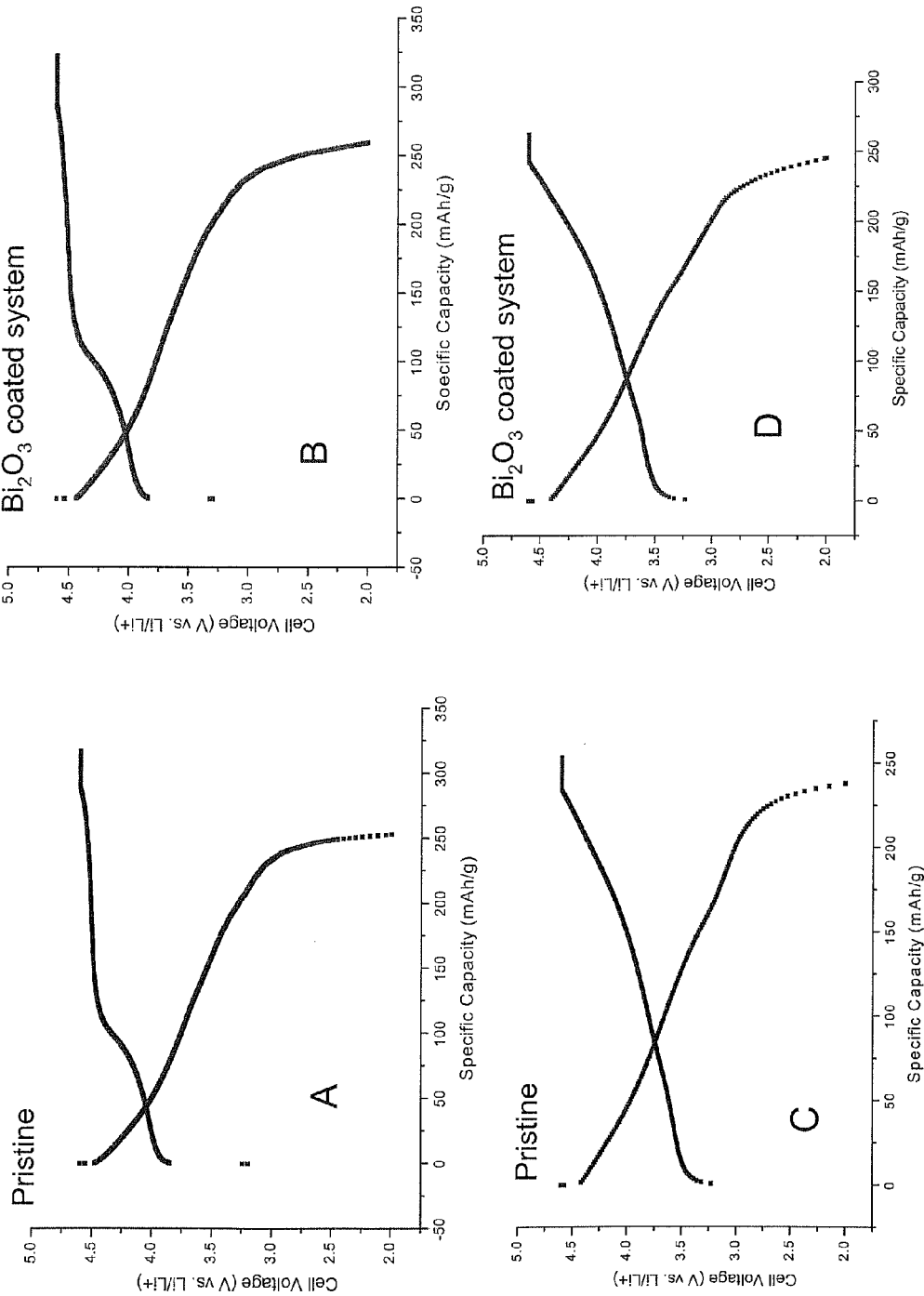
FIG. 13A is first cycle charge and discharge curve of pristine LMO at a rate of 0.1 C.
FIG. 13B is first cycle charge and discharge curve of $Bi_2O_3$ coated LMO at a rate of 0.1 C.
FIG. 13C is the $5^{th}$ cycle charge/discharge curve of pristine LMO at a rate of 0.33 C.
FIG. 13D is the $5^{th}$ cycle charge/discharge curve of $Bi_2O_3$ coated LMO at a rate of 0.33 C.

Coin cells were formed as described in Example 3 using the powders synthesized as described in Example 5. Cell voltage as a function of specific capacity are plotted in FIGS. 13A and 13B for the first charge and discharge cycle at a rate of C/10 for batteries with an uncoated LMO active material and with LMO active material coated with 0.5 weight percent Bi₂O₃, respectively. The coated samples exhibited an increase in discharge specific capacity and a corresponding decrease in first cycle irreversible capacity loss (IRCL). Corresponding charge and discharge plots are presented in FIGS. 13C and 13D for uncoated and 0.5 weight percent coated samples, respectively, for the 5th charge/discharge cycle at a rate of C/3. Again, the battery with appropriately coated sample exhibited a greater discharge specific capacity.

Figure 14:
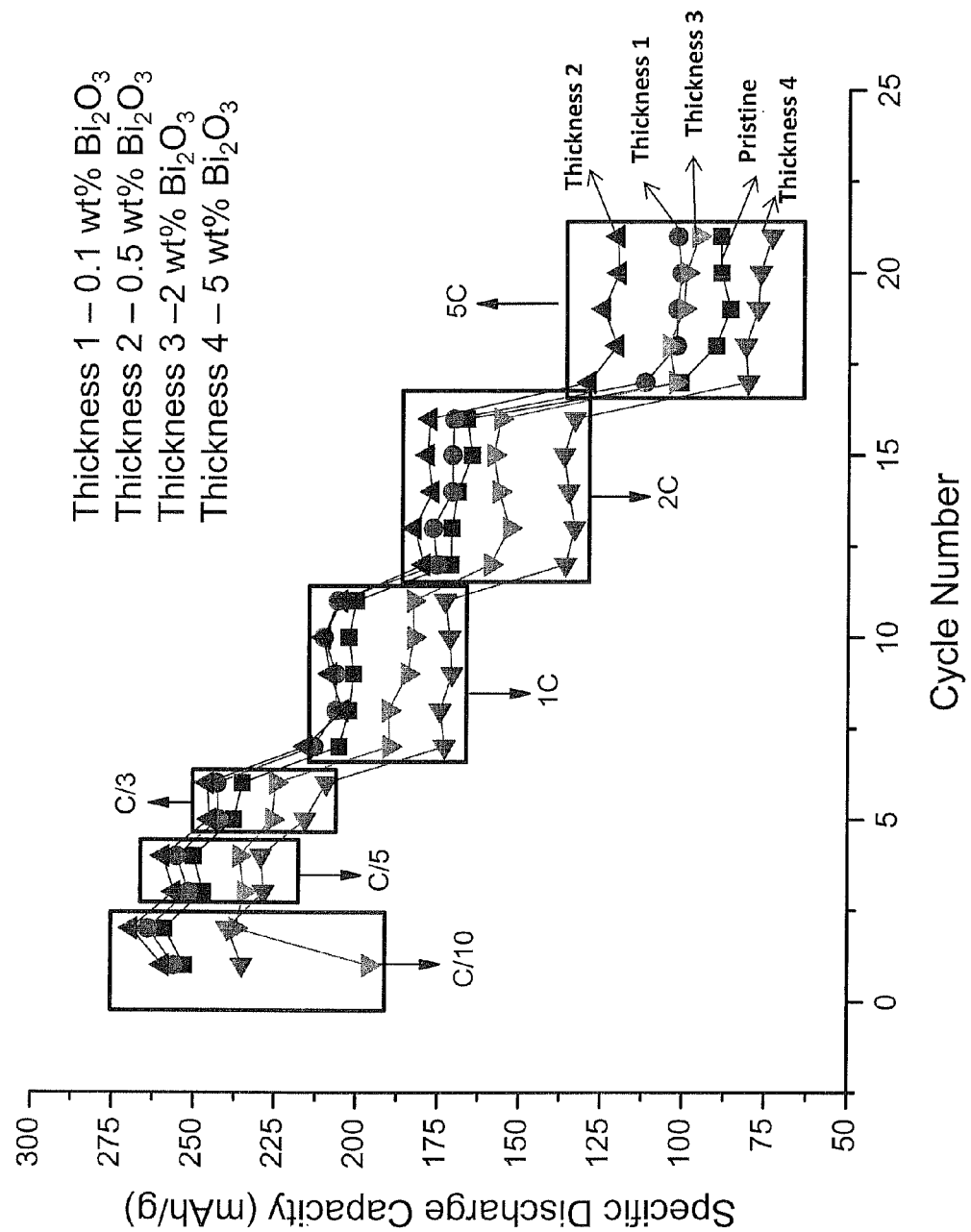
FIG. 14 is a set of plots of specific discharge capacity versus cycle number of pristine LMO and LMO with different $Bi_2O_3$ coating thicknesses cycled at 0.1 C for the first two cycles, 0.2 C for cycle numbers three and four, 0.33 C for cycle numbers five and six, 1.0 C for cycle numbers 7 to 11, 2.0 C for cycle numbers 12 to 16, and 5.0 C for cycle numbers 17 to 21.

Plots of specific discharge capacity as a function of cycle number are presented in FIG. 14 for batteries formed with uncoated lithium metal oxides and for four samples of lithium metal oxides coated with bismuth oxide. Referring to FIG. 14, the batteries were cycled at a discharge rate of C/10 for cycles 1 and 2, C/5 for cycles 3 and 4, C/3 for cycles 5 and 6, 1 C for cycles 7-11, 2 C for cycles 12-16, and 5 C for cycles 17-22. The batteries formed with lithium metal oxide powder with a 0.1 weight percent $Bi_2O_3$ coating and a 0.5 weight percent $Bi_2O_3$ coating had a greater specific discharge capacity relative to batteries formed with uncoated samples at all rates.

Example 7

Lithium Metal Oxides Active Compositions Coated with Magnesium Oxide

This example describes the formation of a magnesium oxide coating on the high capacity lithium rich metal oxides formed as described in Example 1 with the formula of samples 2-8 from Table 3.

A magnesium oxide coating over the high capacity cathode material was performed through the precipitation of magnesium hydroxide followed by a calcination step. Specifically, magnesium nitrate was dissolved in a selected amount of water, and the cathode material to be coated with MgO was dispersed in the magnesium nitrate solution. Then, after the addition of ammonium hydroxide, the mixture was heated roughly at 60° C. for a period of time ranging from 2 to 10 h. Subsequently, the mixture was filtered, and the solid obtained was subjected to copious washing. Then, the solid was calcined at 300-800° C. for 4-12 hours to form magnesium oxide coated LMO powder. The dry powder was collected and fired at 350° C. for 2 h in a conventional muffle furnace in a dry air. The uncoated material of samples 2-8 of Example 1 along with 7 samples with 0.5 wt % MgO coating of the same sample 2-8 were synthesized. X-ray diffractograms taken with the uncoated and MgO coated samples confirm that the coatings do not significantly alter the crystalline structure of the materials.

Example 8

Battery Performance with Magnesium Oxide Coated Materials

This example provides battery performance results for batteries incorporating the positive electrode active materials having magnesium oxide coatings from Example 7.

Figure 15A:
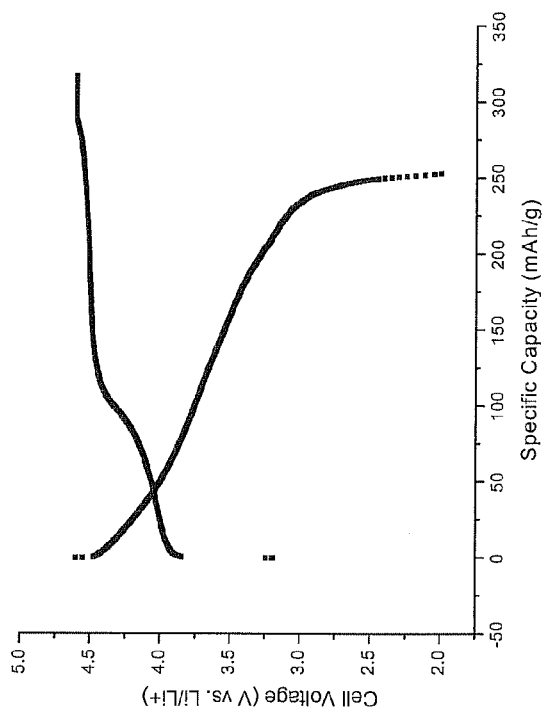
FIGS. 15A and 15B are graphs of cell voltage as a function of specific capacity for the first cycle charge and discharge at a rate of C/10 for coin cells formed from LMO uncoated (A) and coated with 0.5 weight percent magnesium oxide (B).
Figure 15B:
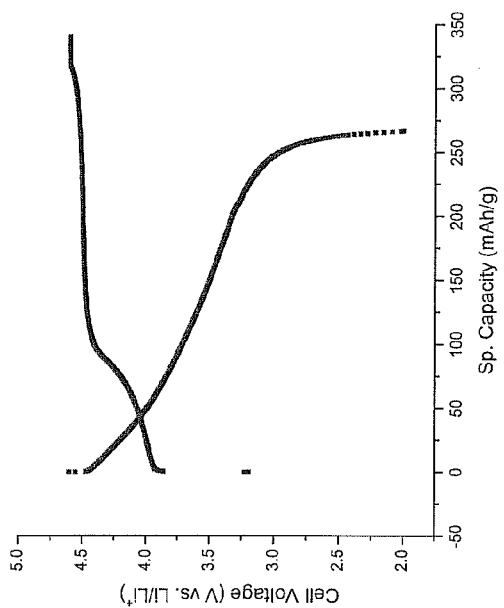
Figure 16A:
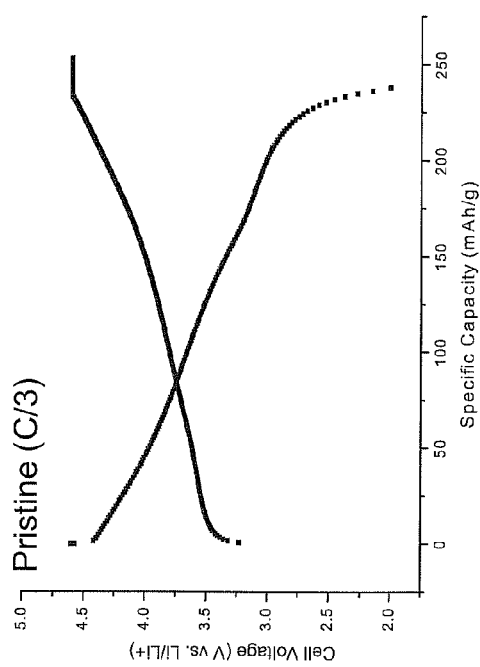
FIGS. 16A and 16B are graphs of cell voltage as a function of specific capacity for the fifth cycle charge and discharge at a rate of C/3 for coin cells formed from LMO uncoated (A) and coated with 0.5 weight percent magnesium oxide (B).
Figure 16B:
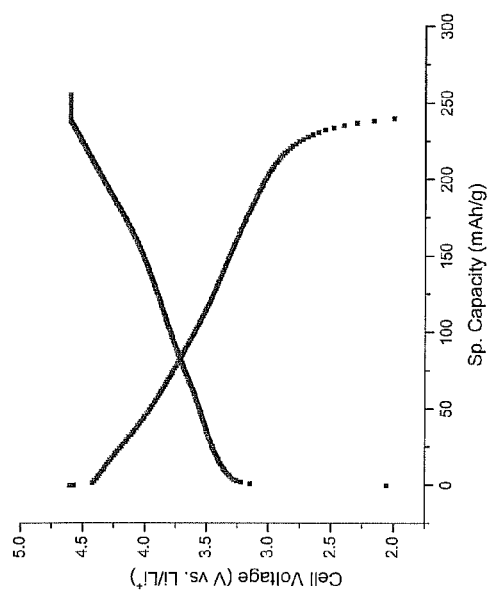

Coin cell batteries were formed as described in Example 3 using the powders synthesized as described in Example 7. Specific capacity at the first charge and discharge cycle, first cycle irreversible capacity loss (IRCL), and average voltage of the batteries are compared and the results are outlined in Table 4 below. As noted above, the irreversible capacity loss is the difference between the first charge capacity and the first discharge capacity for the battery. Plots of the voltage versus the charge and discharge specific capacities for the first cycle (C/10 rate) are presented in FIGS. 15A and 15B, respectively, for batteries formed with uncoated LMO and MgO coated LMO for sample 2 in Example 1. Plots of the voltage versus the charge and discharge specific capacities for the fifth cycle (C/3 rate) are presented in FIGS. 16A and 16B, respectively, for batteries formed with uncoated LMO and MgO coated LMO for sample 2 in Example 1.

The average voltage was obtained in the first discharge cycle for a discharge from 4.6V to 2V at a discharge rate of C/10. Specifically, data shown in Table 6 is directed to battery performance with positive electrode active materials with formula of samples 3, 4, and 6-8 and results from corresponding composite materials coated with 0.5 wt % MgO. The coated samples exhibited an increase in charge and discharge specific capacity and a corresponding same or increased first cycle irreversible capacity loss (IRCL).

TABLE 6

| System | Specific Capacity (mAh/g) Charge | Specific Capacity (mAh/g) Discharge | IRCL (mAh/g) | Average Voltage (V) |
|---|---|---|---|---|
| Sample 3 | 331 | 261 | 70 | 3.576 |
| Sample 3 coated | 340 | 270 | 70 | 3.586 |
| Sample 4 | 332 | 257 | 75 | 3.575 |
| Sample 4 coated | 340 | 267 | 73 | 3.59 |
| Sample 6 | 273 | 226 | 47 | 3.678 |
| Sample 6 coated | 292 | 235 | 57 | 3.7 |
| Sample 7 | 271 | 228 | 43 | 3.717 |
| Sample 7 coated | 291 | 238 | 53 | 3.718 |
| Sample 8 | 230 | 202 | 28 | 3.866 |
| Sample 8 Coated | 233 | 203 | 30 | 3.849 |

Figure 17:
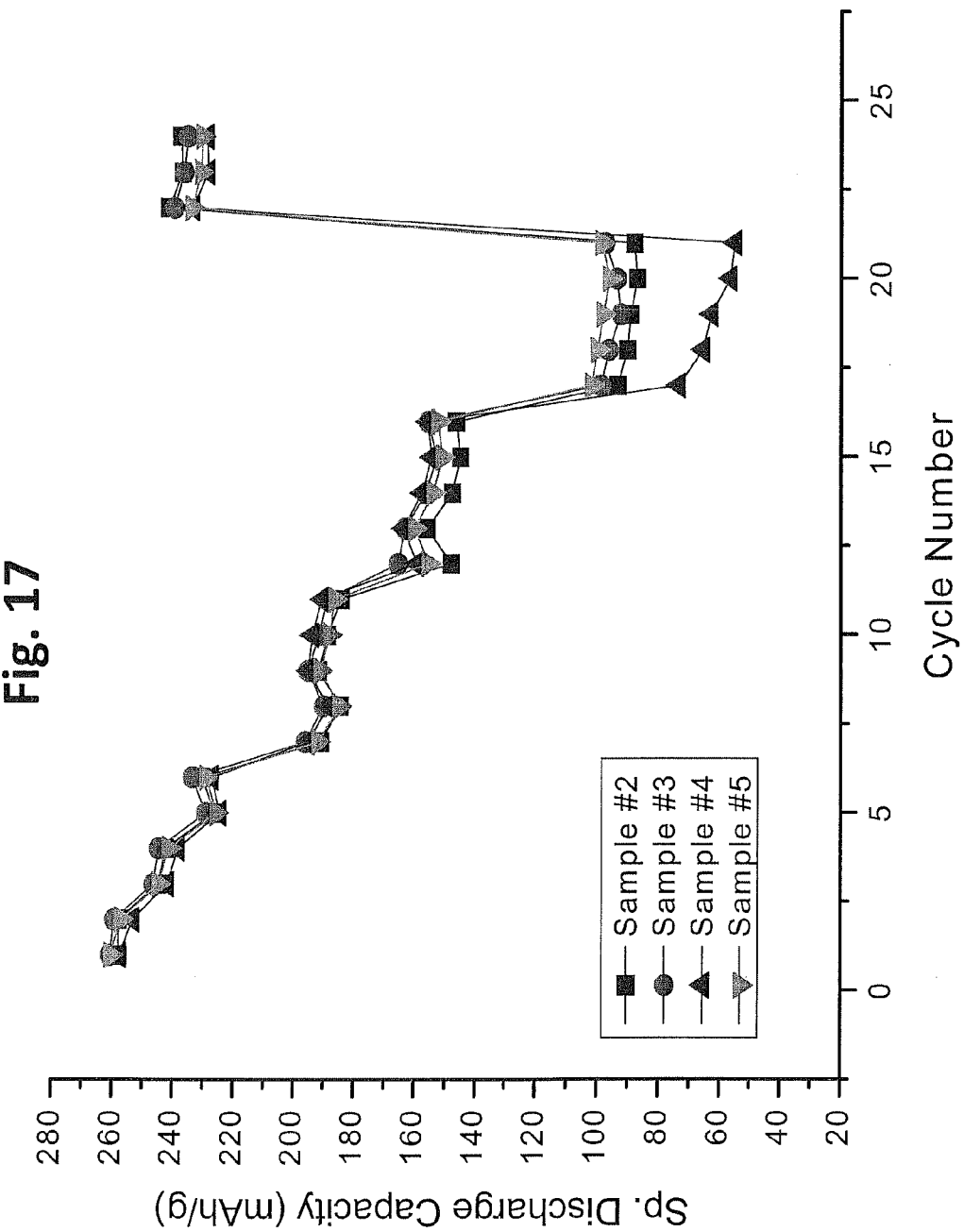
FIG. 17 is a set of plots of specific capacity versus cycle number of pristine LMOs cycled at 0.1 C for the first two cycles, 0.2 C for cycle numbers three and four, 0.33 C for cycle numbers five and six, 1.0 C for cycle numbers 7 to 11, 2.0 C for cycle numbers 12 to 16, 5.0 C for cycle numbers 17 to 21, and 0.2 C for cycle numbers 22 to 24.
Figure 18:
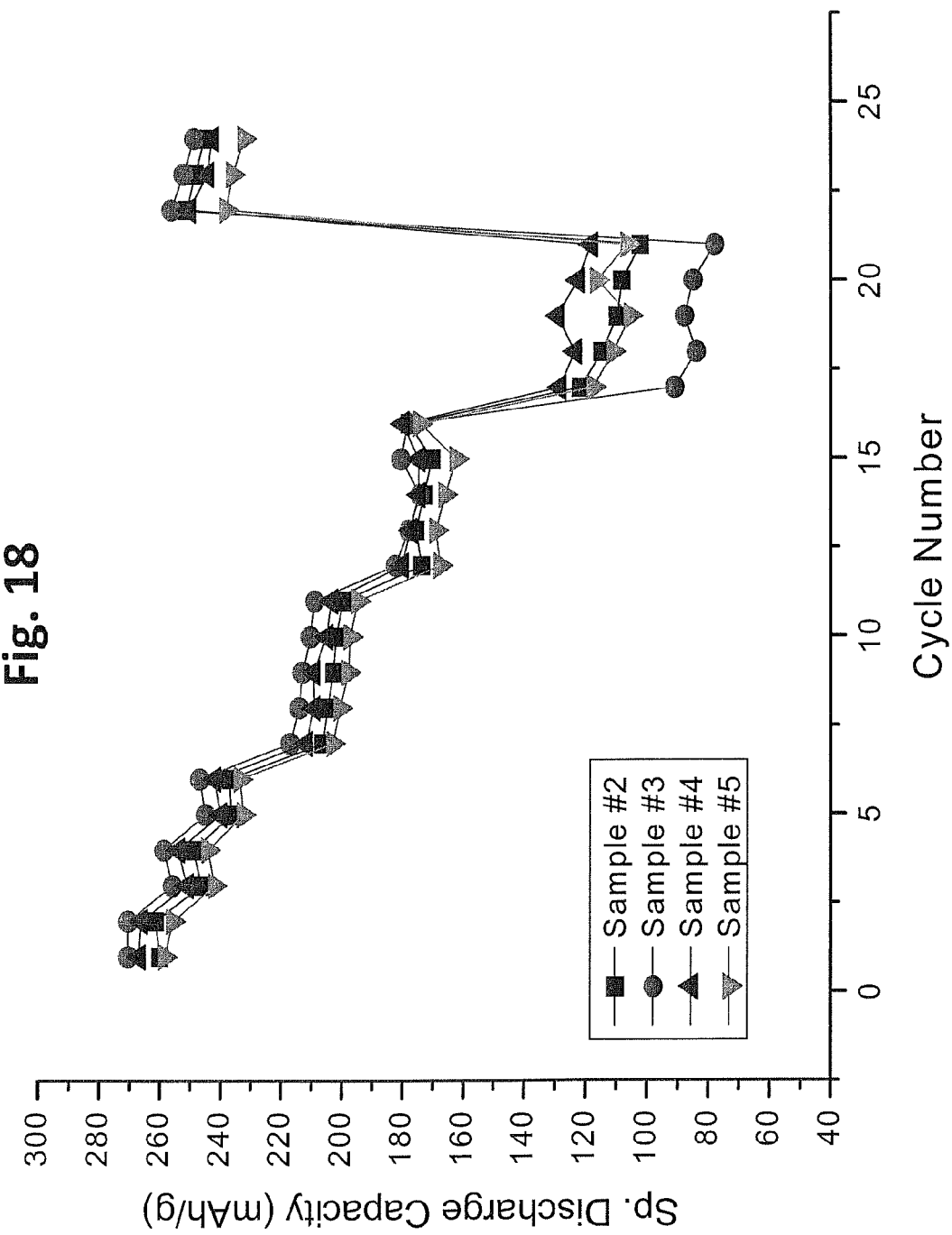
FIG. 18 is a set of plots of specific capacity versus cycle number of LMOs coated with 0.5 wt % MgO cycled at 0.1 C for the first two cycles, 0.2 C for cycle numbers three and four, 0.33 C for cycle numbers five and six, 1.0 C for cycle numbers 7 to 11, 2.0 C for cycle numbers 12 to 16, 5.0 C for cycle numbers 17 to 21, and 0.2 C for cycle numbers 22 to 24.
Figure 19:
FIG. 19 is a set of plots of differential capacity (mAh/V) versus voltage (V) of uncoated LMO and LMO coated with 0.5 wt % MgO.

Batteries formed with pristine and coated LMOs with formula of samples 2-5 are prepared using the procedure outlined in Example 3. Plots of specific discharge capacity as a function of cycle number are presented in FIG. 17 for batteries formed with uncoated lithium metal oxides and in FIG. 18 for batteries formed with 0.5 wt % MgO coated lithium metal oxides. The batteries were cycled at a discharge rate of C/10 for cycles 1 and 2, C/5 for cycles 3 and 4, C/3 for cycles 5 and 6, 1 C for cycles 7-11, 2 C for cycles 12-16, 5 C for cycles 17-21, and 0.2 C for cycles 22-24. Plots of differential capacity (mAh/V) versus voltage (V) of the coated and uncoated samples are shown in FIG. 19. The charging process is plotted as a positive differential capacity, and the discharging process is plotted as a negative discharge capacity. The differential capacity results are qualitatively the same regardless of the coated or uncoated samples used. The discharge peak near 3.8-3.9 volts is believed to be related to the reaction of $LiMO_2$ component of formula I, while the peak near 4.4-4.5 volts is believed to be related to the reaction of the $Li_2MnO_3$ component of the composition.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. As used herein, the notation (value1≦variable≦value2) implicitly assumes that value 1 and value 2 are approximate quantities.

What is claimed is:

1. A lithium ion battery positive electrode material comprising a lithium metal oxide coated with a metal/metalloid oxide coating composition,
    wherein the lithium metal oxide can be approximately represented by a formula $Li_{1+a}Ni_\alpha Mn_\beta Co_\gamma A_\delta O_{2-z}F_z$, where a ranges from about 0.05 to about 0.3, α ranges from 0 to about 0.4, β range from about 0.2 to about 0.65, γ ranges from 0 to about 0.46, δ ranges from about 0 to about 0.15, z ranges from 0 to about 0.2 with the proviso that both α and γ are not zero, and where A is Mg, Sr, Ba, Cd, Zn, Al, Ga, B, Zr, Ti, Ca, Ce, Y, Nb, Cr, Fe, V, or combinations thereof,
    wherein the coating composition comprises less than 2 weight percent of the positive electrode material, and
    wherein after the material is activated in the first cycle to a charge of 4.6V at a rate of C/10, the positive electrode material has a specific discharge capacity of at least about 260 mAh/g with a discharge rate of C/3 when discharged from 4.6V to 2.0 V at room temperature and a specific discharge capacity of at least about 230 mAh/g with a discharge rate of C/3 at the 50th charge/discharge cycle when discharged from 4.6V to 2.0 V at room temperature.

2. The positive electrode material of claim 1 wherein the metal/metalloid oxide coating composition comprises aluminum oxide ($Al_2O_3$), bismuth oxide ($Bi_2O_3$), boron oxide ($B_2O_3$), zirconium oxide ($ZrO_2$), magnesium oxide (MgO), chromium oxide ($Cr_2O_3$), magnesium aluminate ($MgAl_2O_4$), gallium oxide ($Ga_2O_3$), silicon oxide ($SiO_2$), tin oxide ($SnO_2$), calcium oxide ($CaO_2$), strontium oxide (SrO), barium oxide (BaO), titanium oxide ($TiO_2$), iron oxide ($Fe_2O_3$), molybdenum oxide ($MoO_3$ and $MoO_2$), cerium oxide ($CeO_2$), lanthanum oxide ($La_2O_3$), zinc oxide (ZnO), lithium aluminum oxide ($LiAlO_2$), or combinations thereof.

3. The positive electrode material of claim 1 wherein the coating composition comprises aluminum oxide.

4. The positive electrode material of claim 1 wherein the coating composition comprises from about 0.025 to about 1 weight percent of the positive electrode material.

5. The positive electrode material of claim 1 wherein the coating composition comprises from about 0.1 to about 0.75 weight percent of the positive electrode material.

6. The positive electrode material of claim 1 wherein the irreversible capacity loss is reduced by at least about 10% relative to the irreversible capacity loss of the uncoated lithium metal oxide.

7. The positive electrode material of claim 1 wherein z=0 and the lithium metal oxide is approximately represented by the formula x $Li_2MnO_3.(1-x)LiNi_{u+\Delta}Mn_{u-\Delta}Co_wA_yO_2$, wherein $2u+w+y\approx1$, $-0.3\leq\Delta\leq0.3$, $0\leq w\leq1$, $0\leq u\leq0.5$, and $0\leq y\leq0.1$, with the proviso that both (u+$\Delta$) and w are not zero.

8. A lithium ion battery comprising
a positive electrode comprising the positive electrode material of claim 1,
a negative electrode comprising a lithium incorporation composition,
a separator between the positive electrode and the negative electrode, and
an electrolyte comprising lithium ions,
wherein the positive electrode material has a specific discharge capacity of at least about 230 mAh/g with a discharge rate of C/3 at the 50th charge/discharge cycle when discharged from 4.6V to 2.0 V at room temperature.

9. The lithium ion battery of claim 1 wherein the coating composition comprises less than about 1 weight percent of the positive electrode material.

10. A method for forming the coated positive electrode active material of claim 1, the method comprising heating the lithium rich metal oxide with an aluminum precursor coating to a temperature from about 500° C. to about 800° C.

11. The method of claim 10 wherein the aluminum precursor coating comprises aluminum hydroxide.

12. The method of claim 10 wherein the coated positive electrode active material formed comprises from about 0.1 to about 0.75 weight percent of an aluminum oxide coating composition.

13. The positive electrode material of claim 1 wherein the lithium metal oxide can be approximately represented by a formula of $xLi_2M'O_3.(1-x)LiM''O_2$, where M' represents one or more metal ions having an average valance of +4 and M" represents one or more metal ions having an average valance of +3, and 0<x<1.

14. The positive electrode material of claim 1 wherein the irreversible capacity loss is reduced by at least about 15% relative to the irreversible capacity loss of the uncoated lithium metal oxide.

15. The positive electrode material of claim 1 having a specific discharge capacity of at least about 270 mAh/g with a discharge rate of C/3 when discharged from 4.6V to 2.0V at room temperature.

16. The positive electrode material of claim 1 having a specific discharge capacity of at least about 245 mAh/g with a discharge rate of C/3 at the 50th charge/discharge cycle when discharged from 4.6V to 2.0 V at room temperature.

* * * * *